(12) United States Patent
Bedewy et al.

(10) Patent No.: US 12,658,983 B2
(45) Date of Patent: Jun. 16, 2026

(54) APERTURE MAGNIFICATION USING REFLECTIVE COMPONENTS FOR SPATIALLY MULTIPLEXED LINE OF SIGHT COMMUNICATIONS

(71) Applicant: QUALCOMM Incorporated, San Diego, CA (US)

(72) Inventors: Ahmed Bedewy, Hillsborough, NJ (US); Juergen Cezanne, Ocean Township, NJ (US); Meilong Jiang, Westfield, NJ (US); Ashwin Sampath, Skillman, NJ (US); Junyi Li, Fairless Hills, PA (US); Ozge Koymen, Princeton, NJ (US); Danlu Zhang, San Diego, CA (US); Yavuz Yapici, Florham Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 369 days.

(21) Appl. No.: 18/452,398

(22) Filed: Aug. 18, 2023

(65) Prior Publication Data

US 2025/0062793 A1     Feb. 20, 2025

(51) Int. Cl.
*H04B 7/04*          (2017.01)
*H04B 7/06*          (2006.01)

(52) U.S. Cl.
CPC ....... *H04B 7/04013* (2023.05); *H04B 7/0615* (2013.01)

(58) Field of Classification Search
CPC   H04B 7/04013; H04B 7/0615; H04B 7/0617; H01Q 3/46; H01Q 15/148; H01Q 19/17
See application file for complete search history.

(56) References Cited

U.S. PATENT DOCUMENTS

2014/0146916 A1 *   5/2014   Shattil .................. H04J 13/004
                                                                       375/295
2017/0276546 A1 *   9/2017   Sakai ................... H04N 9/3144
(Continued)

FOREIGN PATENT DOCUMENTS

WO      WO-2022213000 A1    10/2022

OTHER PUBLICATIONS

Chen W., et al., "Channel Customization for Joint Tx-RISs-Rx Design in Hybrid mmWave Systems", Arxiv.Org, Cornell University Library, 201 Olin Library Cornell University Ithaca, NY 14853, May 3, 2023, XP091500805, DOI: 10.1109/TWC.2023.3262272, p. 1-9, Figure 1.

(Continued)

*Primary Examiner* — Fred A Casca
(74) *Attorney, Agent, or Firm* — QUALCOMM Incorporated

(57) ABSTRACT

Methods, systems, and devices for wireless communications are described. The described techniques may enable transmitting and receiving devices to increase an effective aperture size of transmitting and receiving antenna arrays, which may increase an achievable rank of spatially multiplexed communications. For example, one or both of the transmitting device and the receiving device may use a reflective component to reflect signals transmitted between the devices, which may allow for larger effective aperture sizes without increasing a physical distance between antenna elements. In some examples, the reflective component may be a static concave mirror associated with a predetermined weight vector and focal point. In some examples, the concave mirror may be a reflective intelligent surface (RIS) of reflective elements with reflective properties which may be dynamically adjusted to various weight vectors. An orien- (Continued)

tation of the RIS may be adjusted to steer a beam in various directions in space.

30 Claims, 18 Drawing Sheets

(56)                    References Cited

U.S. PATENT DOCUMENTS

| | | | |
|---|---|---|---|
| 2018/0109002 A1 | 4/2018 | Foo | |
| 2023/0063645 A1 | 3/2023 | Gurelli et al. | |
| 2023/0327714 A1* | 10/2023 | Baligh ................... | H04B 7/026 |
| | | | 375/262 |
| 2024/0413858 A1* | 12/2024 | Mcmenamy .......... | H04W 24/10 |
| 2025/0317164 A1* | 10/2025 | Ali ....................... | H04B 7/0695 |

OTHER PUBLICATIONS

International Search Report and Written Opinion—PCT/US2024/041749—ISA/EPO—Nov. 11, 2024 (2305167WO).
Meng S., et al., "Rank Optimization for MIMO Systems with RIS: Simulation and Measurement", Arxiv.Org, Cornell University Library, 201 Olin Library Cornell University Ithaca, NY 14853, Jul. 25, 2023, XP091573301, p. 1-3, Figures 1, 2.

* cited by examiner

510

520

515

505

500

RIS Adjustment Procedure Manager

1125

Signal Reflection Manager

1130

1120

1100

130                105                115

Network
Entity

Transceiver        Antenna 1210        1215

Communications
Manager        Memory

Code

1230

1240        1225

1220

Processor

1235

1205

1200

Figure 13:
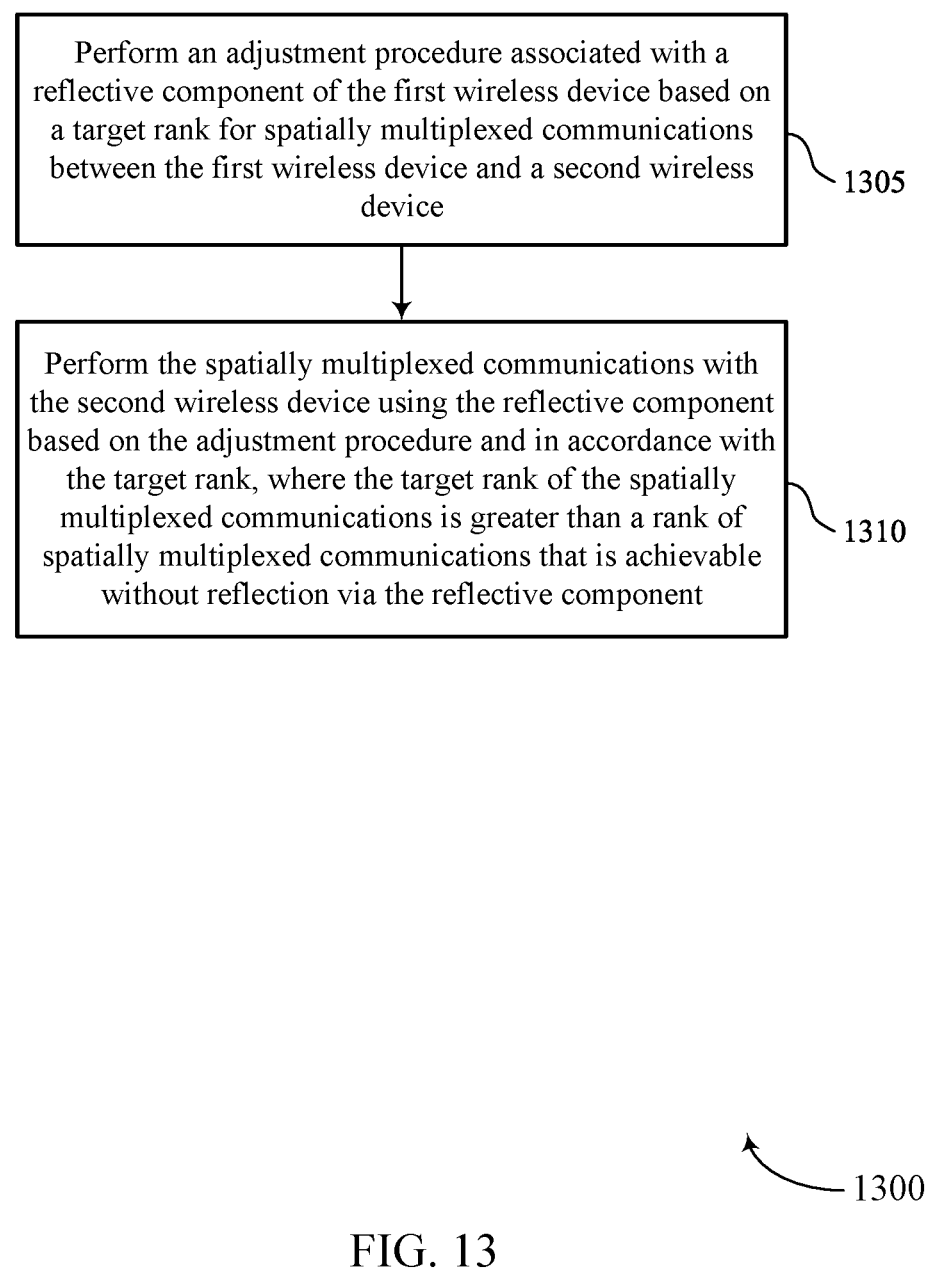

Perform an adjustment procedure associated with a reflective component of the first wireless device based on a target rank for spatially multiplexed communications between the first wireless device and a second wireless device

1305

Perform the spatially multiplexed communications with the second wireless device using the reflective component based on the adjustment procedure and in accordance with the target rank, where the target rank of the spatially multiplexed communications is greater than a rank of spatially multiplexed communications that is achievable without reflection via the reflective component

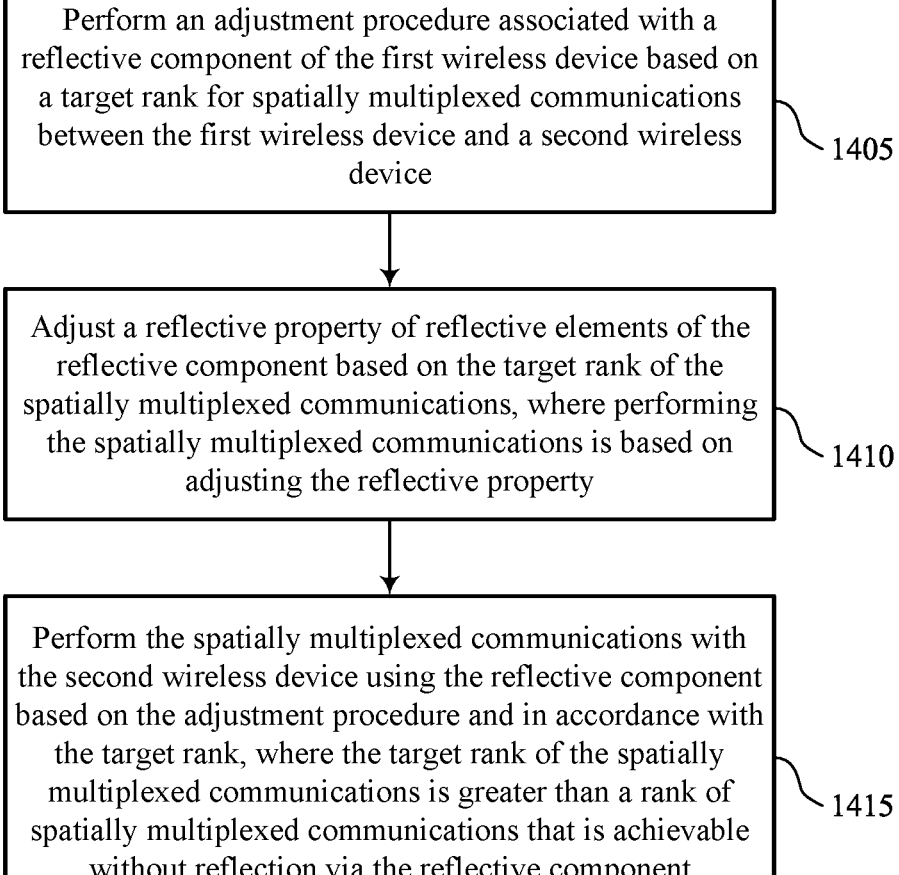

Perform an adjustment procedure associated with a reflective component of the first wireless device based on a target rank for spatially multiplexed communications between the first wireless device and a second wireless device

1405

Adjust a reflective property of reflective elements of the reflective component based on the target rank of the spatially multiplexed communications, where performing the spatially multiplexed communications is based on adjusting the reflective property

1410

Perform the spatially multiplexed communications with the second wireless device using the reflective component based on the adjustment procedure and in accordance with the target rank, where the target rank of the spatially multiplexed communications is greater than a rank of spatially multiplexed communications that is achievable without reflection via the reflective component

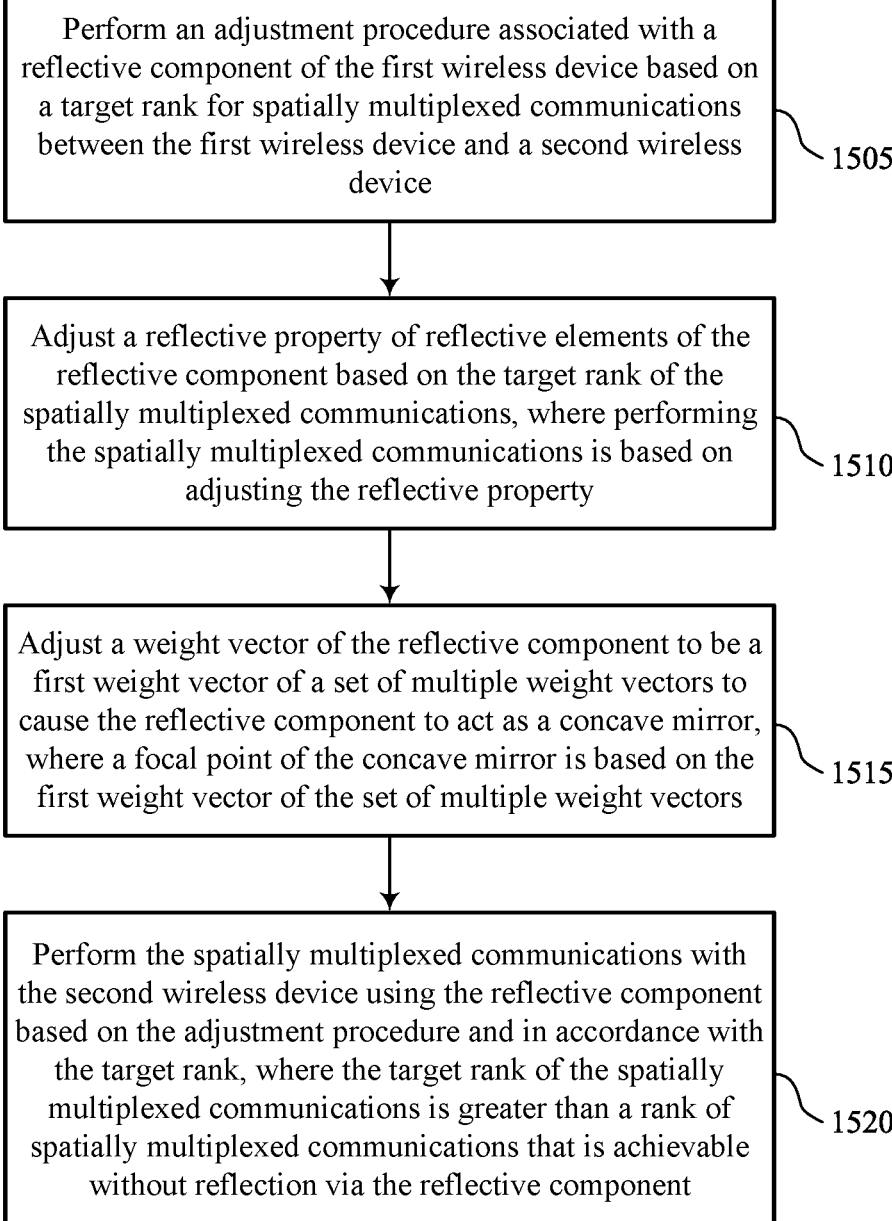

Perform an adjustment procedure associated with a reflective component of the first wireless device based on a target rank for spatially multiplexed communications between the first wireless device and a second wireless device    1505

Adjust a reflective property of reflective elements of the reflective component based on the target rank of the spatially multiplexed communications, where performing the spatially multiplexed communications is based on adjusting the reflective property    1510

Adjust a weight vector of the reflective component to be a first weight vector of a set of multiple weight vectors to cause the reflective component to act as a concave mirror, where a focal point of the concave mirror is based on the first weight vector of the set of multiple weight vectors    1515

Perform the spatially multiplexed communications with the second wireless device using the reflective component based on the adjustment procedure and in accordance with the target rank, where the target rank of the spatially multiplexed communications is greater than a rank of spatially multiplexed communications that is achievable without reflection via the reflective component    1520

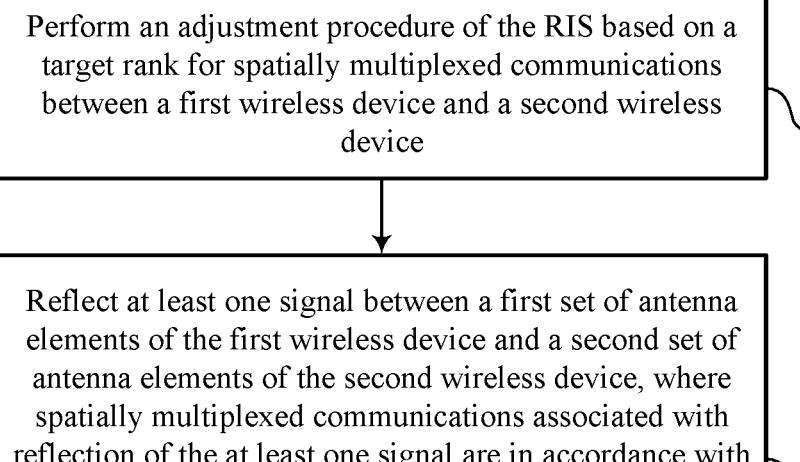

Perform an adjustment procedure of the RIS based on a target rank for spatially multiplexed communications between a first wireless device and a second wireless device

⟋ 1605

Reflect at least one signal between a first set of antenna elements of the first wireless device and a second set of antenna elements of the second wireless device, where spatially multiplexed communications associated with reflection of the at least one signal are in accordance with the target rank, and where the target rank of the spatially multiplexed communications is greater than a rank of spatially multiplexed communications that is achievable without reflection via the RIS

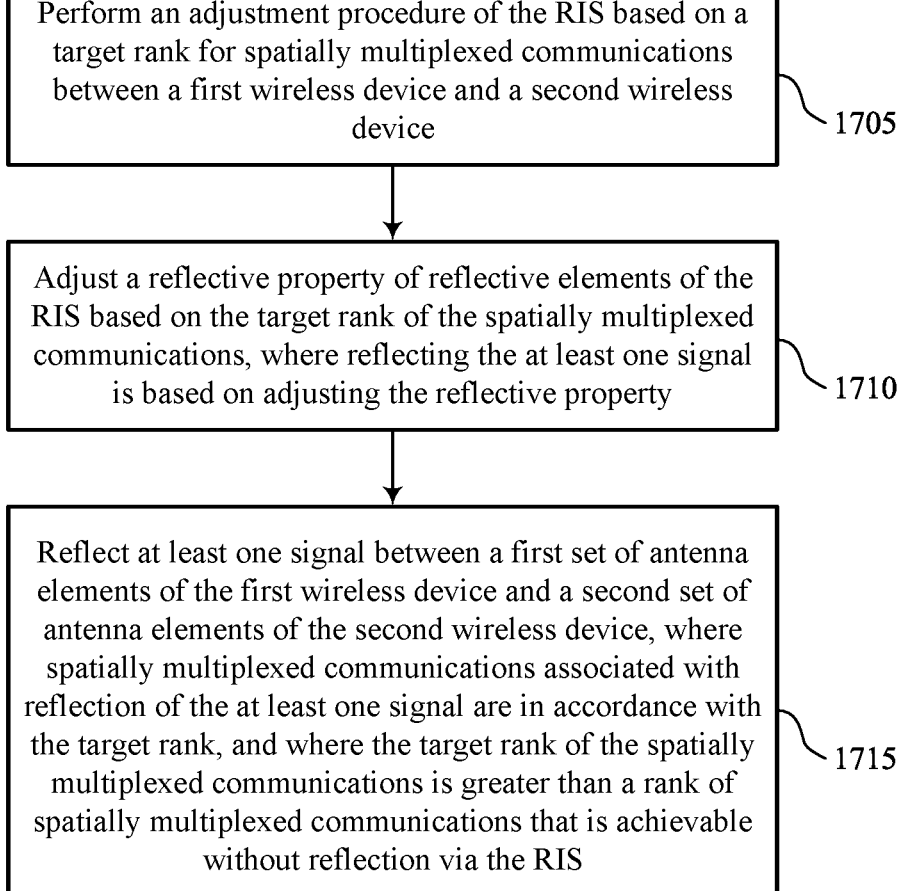

Perform an adjustment procedure of the RIS based on a target rank for spatially multiplexed communications between a first wireless device and a second wireless device

1705

Adjust a reflective property of reflective elements of the RIS based on the target rank of the spatially multiplexed communications, where reflecting the at least one signal is based on adjusting the reflective property

1710

Reflect at least one signal between a first set of antenna elements of the first wireless device and a second set of antenna elements of the second wireless device, where spatially multiplexed communications associated with reflection of the at least one signal are in accordance with the target rank, and where the target rank of the spatially multiplexed communications is greater than a rank of spatially multiplexed communications that is achievable without reflection via the RIS

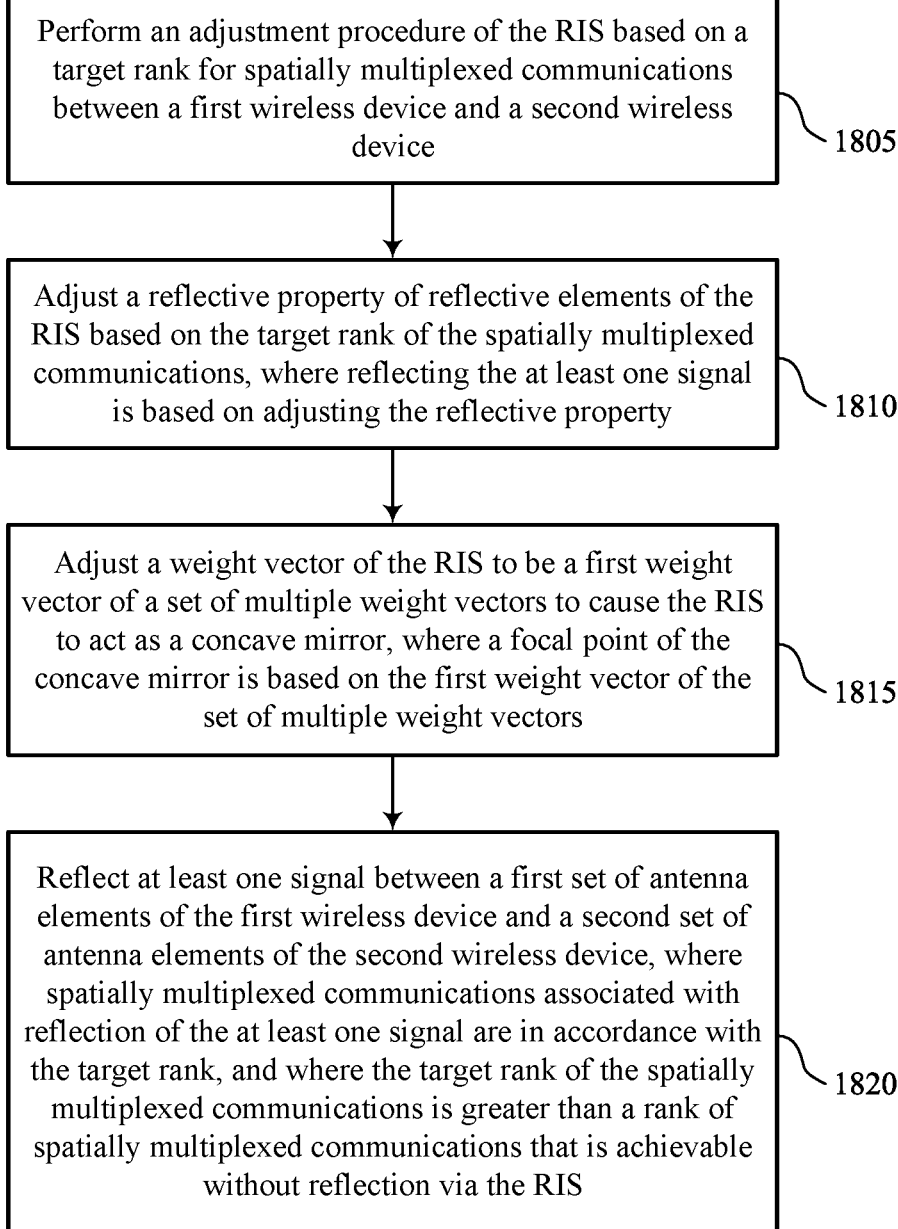

Perform an adjustment procedure of the RIS based on a target rank for spatially multiplexed communications between a first wireless device and a second wireless device

1805

Adjust a reflective property of reflective elements of the RIS based on the target rank of the spatially multiplexed communications, where reflecting the at least one signal is based on adjusting the reflective property

1810

Adjust a weight vector of the RIS to be a first weight vector of a set of multiple weight vectors to cause the RIS to act as a concave mirror, where a focal point of the concave mirror is based on the first weight vector of the set of multiple weight vectors

1815

Reflect at least one signal between a first set of antenna elements of the first wireless device and a second set of antenna elements of the second wireless device, where spatially multiplexed communications associated with reflection of the at least one signal are in accordance with the target rank, and where the target rank of the spatially multiplexed communications is greater than a rank of spatially multiplexed communications that is achievable without reflection via the RIS

APERTURE MAGNIFICATION USING REFLECTIVE COMPONENTS FOR SPATIALLY MULTIPLEXED LINE OF SIGHT COMMUNICATIONS

FIELD OF TECHNOLOGY

The following relates to wireless communications, including aperture magnification using reflective components for spatially multiplexed line of sight (LOS) communication.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, fifth generation (5G) systems, which may be referred to as New Radio (NR) systems, and sixth generation (6G) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support aperture magnification using reflective components for spatially multiplexed line of sight (LOS) communication. For example, the described techniques provide for an increased effective aperture size of transmitting and receiving antenna arrays, and thus a larger achievable quantity of layers (e.g., larger number of achievable layers) per polarization for spatial multiplexing in multiple input multiple output (MIMO) communications. That is, the described techniques may enable transmitting and receiving devices to increase an effective aperture size without increasing a physical aperture size (and thus increasing a cost of implementation). For example, one or both of the transmitting device and the receiving device may use a reflective component to reflect signals transmitted between the devices, which may result in larger effective aperture sizes without increasing a physical distance between antenna subarrays or subcomponents (e.g., antenna elements). In some examples, the reflective component may be a static concave mirror associated with a focal point. In some examples, the reflective component may be a reflective intelligent surface (RIS) having multiple reflective elements with reflective properties which may be dynamically adjusted to on the basis of one of various weight vectors associated with the RIS, each of which may be associated with a focal point. An orientation of the RIS may be adjusted to steer a beam in various directions in space, which may enable wireless devices to perform effective beamforming with relatively fewer antenna elements (e.g., as compared to a wireless device without a RIS).

A method for wireless communications by a first wireless device is described. The method may include performing an adjustment procedure associated with a reflective component of the first wireless device based on a target rank for spatially multiplexed communications between the first wireless device and a second wireless device and performing the spatially multiplexed communications with the second wireless device using the reflective component based on the adjustment procedure and in accordance with the target rank, where the target rank of the spatially multiplexed communications is greater than a rank of spatially multiplexed communications that is achievable without reflection via the reflective component.

A first wireless device for wireless communications is described. The first wireless device may include one or more memories storing processor executable code, and one or more processors coupled with the one or more memories. The one or more processors may individually or collectively operable to execute the code to cause the first wireless device to perform an adjustment procedure associated with a reflective component of the first wireless device based on a target rank for spatially multiplexed communications between the first wireless device and a second wireless device and perform the spatially multiplexed communications with the second wireless device using the reflective component based on the adjustment procedure and in accordance with the target rank, where the target rank of the spatially multiplexed communications is greater than a rank of spatially multiplexed communications that is achievable without reflection via the reflective component.

Another first wireless device for wireless communications is described. The first wireless device may include means for performing an adjustment procedure associated with a reflective component of the first wireless device based on a target rank for spatially multiplexed communications between the first wireless device and a second wireless device and means for performing the spatially multiplexed communications with the second wireless device using the reflective component based on the adjustment procedure and in accordance with the target rank, where the target rank of the spatially multiplexed communications is greater than a rank of spatially multiplexed communications that is achievable without reflection via the reflective component.

A non-transitory computer-readable medium storing code for wireless communications is described. The code may include instructions executable by a processor to perform an adjustment procedure associated with a reflective component of the first wireless device based on a target rank for spatially multiplexed communications between the first wireless device and a second wireless device and perform the spatially multiplexed communications with the second wireless device using the reflective component based on the adjustment procedure and in accordance with the target rank, where the target rank of the spatially multiplexed communications is greater than a rank of spatially multiplexed communications that is achievable without reflection via the reflective component.

In some examples of the method, first wireless devices, and non-transitory computer-readable medium described herein, the reflective component may be a RIS, and performing the adjustment procedure may include operations, features, means, or instructions for adjusting a reflective property of reflective elements of the RIS based on the target rank of the spatially multiplexed communications, where performing the spatially multiplexed communications may be based on adjusting the reflective property.

3

In some examples of the method, first wireless devices, and non-transitory computer-readable medium described herein, the RIS may be associated with a set of multiple weight vectors, and adjusting the reflective property of the reflective elements may include operations, features, means, or instructions for adjusting a weight vector of the RIS to be a first weight vector of the set of multiple weight vectors to cause the RIS to act as a concave mirror, where a focal point of the concave mirror may be based on the first weight vector of the set of multiple weight vectors.

In some examples of the method, first wireless devices, and non-transitory computer-readable medium described herein, adjusting the reflective property of the reflective elements of the RIS may include operations, features, means, or instructions for adjusting the reflective property of the reflective elements of the RIS to increase one or more first effective distances between antenna elements of a first set of antenna elements of the first wireless device or one or more second effective distances between antenna elements of a second set of antenna elements of the second wireless device based on a focal point of the RIS, where the one or more first effective distances and the one or more second effective distances may be based on the target rank of the spatially multiplexed communications.

In some examples of the method, first wireless devices, and non-transitory computer-readable medium described herein, performing the adjustment procedure may include operations, features, means, or instructions for adjusting an orientation of the reflective component based on a first position of a first set of antenna elements of the first wireless device and a second position of a second set of antenna elements of the second wireless device, where performing the spatially multiplexed communications may be based on adjusting the orientation.

In some examples of the method, first wireless devices, and non-transitory computer-readable medium described herein, the rank of spatially multiplexed communications that may be achievable without reflection via the reflective component may be based on one or more first distances between antenna elements of a first set of antenna elements of the first wireless device, one or more second distances between antenna elements of a second set of antenna elements of the second wireless device, and a third distance between the first set of antenna elements and the second set of antenna elements.

In some examples of the method, first wireless devices, and non-transitory computer-readable medium described herein, a focal point of the reflective component may be based on the target rank of the spatially multiplexed communications.

In some examples of the method, first wireless devices, and non-transitory computer-readable medium described herein, performing the spatially multiplexed communications may include operations, features, means, or instructions for performing the spatially multiplexed communications with the second wireless device in accordance with a second reflective component of the second wireless device.

In some examples of the method, first wireless devices, and non-transitory computer-readable medium described herein, a first set of antenna elements of the first wireless device may be a set of transmitting antenna elements and a second set of antenna elements of the second wireless device may be a set of receiving antenna elements.

In some examples of the method, first wireless devices, and non-transitory computer-readable medium described herein, a first set of antenna elements of the first wireless device may be a set of receiving antenna elements and a second set of antenna elements of the second wireless device may be a set of transmitting antenna elements.

In some examples of the method, first wireless devices, and non-transitory computer-readable medium described herein, the reflective component may be a concave mirror.

A method for wireless communications by a RIS is described. The method may include performing an adjustment procedure of the RIS based on a target rank for spatially multiplexed communications between a first wireless device and a second wireless device and reflecting at least one signal between a first set of antenna elements of the first wireless device and a second set of antenna elements of the second wireless device, where spatially multiplexed communications associated with reflection of the at least one signal are in accordance with the target rank, and where the target rank of the spatially multiplexed communications is greater than a rank of spatially multiplexed communications that is achievable without reflection via the RIS.

A RIS for wireless communications is described. The RIS may include one or more memories storing processor executable code, and one or more processors coupled with the one or more memories. The one or more processors may individually or collectively operable to execute the code to cause the RIS to perform an adjustment procedure of the RIS based on a target rank for spatially multiplexed communications between a first wireless device and a second wireless device and reflect at least one signal between a first set of antenna elements of the first wireless device and a second set of antenna elements of the second wireless device, where spatially multiplexed communications associated with reflection of the at least one signal are in accordance with the target rank, and where the target rank of the spatially multiplexed communications is greater than a rank of spatially multiplexed communications that is achievable without reflection via the RIS.

Another RIS for wireless communications is described. The RIS may include means for performing an adjustment procedure of the RIS based on a target rank for spatially multiplexed communications between a first wireless device and a second wireless device and means for reflecting at least one signal between a first set of antenna elements of the first wireless device and a second set of antenna elements of the second wireless device, where spatially multiplexed communications associated with reflection of the at least one signal are in accordance with the target rank, and where the target rank of the spatially multiplexed communications is greater than a rank of spatially multiplexed communications that is achievable without reflection via the RIS.

A non-transitory computer-readable medium storing code for wireless communications is described. The code may include instructions executable by a processor to perform an adjustment procedure of the RIS based on a target rank for spatially multiplexed communications between a first wireless device and a second wireless device and reflect at least one signal between a first set of antenna elements of the first wireless device and a second set of antenna elements of the second wireless device, where spatially multiplexed communications associated with reflection of the at least one signal are in accordance with the target rank, and where the target rank of the spatially multiplexed communications is greater than a rank of spatially multiplexed communications that is achievable without reflection via the RIS.

In some examples of the method, RISs, and non-transitory computer-readable medium described herein, performing the adjustment procedure may include operations, features, means, or instructions for adjusting a reflective property of reflective elements of the RIS based on the target rank of the spatially multiplexed communications, where reflecting the at least one signal may be based on adjusting the reflective property.

In some examples of the method, RISs, and non-transitory computer-readable medium described herein, the RIS may be associated with a set of multiple weight vectors, and adjusting the reflective property of the reflective elements may include operations, features, means, or instructions for adjusting a weight vector of the RIS to be a first weight vector of the set of multiple weight vectors to cause the RIS to act as a concave mirror, where a focal point of the concave mirror may be based on the first weight vector of the set of multiple weight vectors.

In some examples of the method, RISs, and non-transitory computer-readable medium described herein, adjusting the reflective property of the reflective elements of the RIS may include operations, features, means, or instructions for adjusting the reflective property of the reflective elements of the RIS to increase one or more first effective distances between antenna elements of the first set of antenna elements of the first wireless device or one or more second effective distances between antenna elements of the second set of antenna elements of the second wireless device based on a focal point of the RIS, where the one or more first effective distances and the one or more second effective distances may be based on the target rank of the spatially multiplexed communications.

In some examples of the method, RISs, and non-transitory computer-readable medium described herein, performing the adjustment procedure may include operations, features, means, or instructions for adjusting an orientation of the RIS based on a first position of the first set of antenna elements of the first wireless device and a second position of the second set of antenna elements of the second wireless device, where reflecting the at least one signal may be based on adjusting the orientation.

In some examples of the method, RISs, and non-transitory computer-readable medium described herein, the rank of spatially multiplexed communications that may be achievable without reflection via the RIS may be based on one or more first distances between antenna elements of the first set of antenna elements of the first wireless device, one or more second distances between antenna elements of the second set of antenna elements of the second wireless device, and a third distance between the first set of antenna elements and the second set of antenna elements.

In some examples of the method, RISs, and non-transitory computer-readable medium described herein, a focal point of the RIS may be based on the target rank of the spatially multiplexed communications.

In some examples of the method, RISs, and non-transitory computer-readable medium described herein, the RIS may be a reflective component of the first wireless device.

In some examples of the method, RISs, and non-transitory computer-readable medium described herein, the first set of antenna elements of the first wireless device may be a set of transmitting antenna elements and the second set of antenna elements of the second wireless device may be a set of receiving antenna elements.

In some examples of the method, RISs, and non-transitory computer-readable medium described herein, the first set of antenna elements of the first wireless device may be a set of receiving antenna elements and the second set of antenna elements of the second wireless device may be a set of transmitting antenna elements.

In some examples of the method, RISs, and non-transitory computer-readable medium described herein, reflecting the at least one signal may include operations, features, means, or instructions for reflecting the at least one signal based on a second reflective component of the second wireless device.

BRIEF DESCRIPTION OF THE DRAWINGS

FIGS. 13 through 18 show flowcharts illustrating methods that support aperture magnification using reflective components for spatially multiplexed LOS communication in accordance with one or more aspects of the present disclosure.

DETAILED DESCRIPTION

Figure 1:
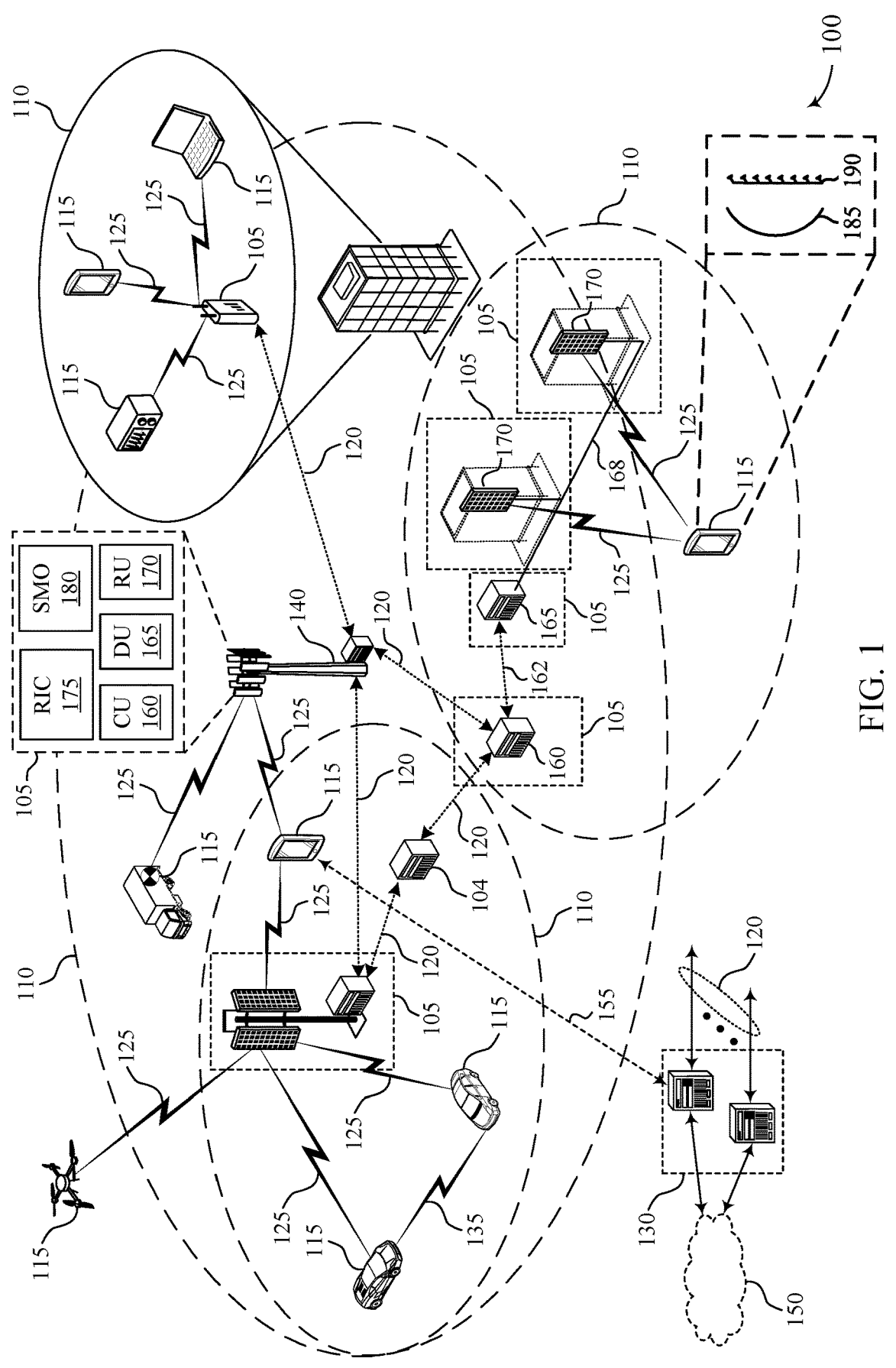
FIG. 1 shows an example of a wireless communications system that supports aperture magnification using reflective components for spatially multiplexed line of sight (LOS) communication in accordance with one or more aspects of the present disclosure.

In some wireless communications systems, a transmitting device may transmit line-of-sight (LOS) signals to a receiving device. In such systems, an achievable spatial multiplexing order (e.g., an achievable rank or quantity of transmission layers (e.g., per polarization)) may increase with respective aperture sizes of transmitting and receiving antenna elements. That is, transmitting and receiving devices with larger distances between antenna elements may achieve a larger spatial multiplexing rank than transmitting and receiving devices with smaller distances between antenna elements. Further, the achievable spatial multiplexing rank may decrease as a distance (R) between the transmitting device and the receiving device increases. That is, transmitting and receiving devices that are further apart may achieve a smaller spatial multiplexing rank than transmitting and receiving devices that are closer to one another. Thus, larger respective aperture sizes of the transmitting device and the receiving device may increase a performance quality for systems with a large distance R. However, large aperture sizes (e.g., larger distances between antenna elements in antenna subarrays) may be associated with increased hardware costs such as longer cables between antenna arrays, phase-locked loops (PLLs), phase rotators, and other hardware and processing requirements, along with an increase in spatial dimensions or sizes, which may increase the cost of implementation or may limit the use cases (e.g., due to size limitations in certain scenarios).

Accordingly, techniques described herein may allow for an increased effective aperture size and thus a larger achievable quantity of layers per polarization for spatial multiplexing in multiple input multiple output (MIMO) communications. That is, the described techniques may enable transmitting and receiving devices to increase effective aperture sizes of antenna arrays (e.g., without increasing physical aperture sizes and thus increasing the cost of implementation). For example, one or both of the transmitting device and the receiving device may use a reflective component (e.g., a concave mirror or other elements configured to operate as a mirror) to reflect signals between the devices. The reflective component may magnify the aperture sizes of antenna arrays of the transmitting device or the receiving devices, which may allow for larger effective aperture sizes without increasing a physical distance between antenna subarrays.

In some examples, the reflective component may be a static concave mirror associated with a weight vector (e.g., a predetermined weight vector associated with a magnification factor and focal point determined during manufacturing). In some examples, the reflective component may be a reflective intelligent surface (RIS) of reflective elements with reflective properties which may be dynamically adjusted. That is, the RIS may be associated with various weight vectors and corresponding focal points, and a wireless device may adjust the RIS to a given weight vector (e.g., depending on a distance between the transmitting device and the receiving device). Further, the wireless device may adjust an orientation of the RIS to steer a beam in one or more directions in space, which may enable the wireless device to perform effective beamforming for LOS communications with various devices with relatively fewer antenna elements (e.g., as compared to a system without a RIS).

Aspects of the disclosure are initially described in the context of wireless communications systems. Aspects of the disclosure are further described with reference to optical component diagrams and process flow diagrams. Aspects of the disclosure are further illustrated by and described with reference to apparatus diagrams, system diagrams, and flowcharts that relate to aperture magnification using reflective components for spatially multiplexed LOS communication.

FIG. 1 shows an example of a wireless communications system 100 that supports aperture magnification using reflective components for spatially multiplexed LOS communication in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c. F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support aperture magnification using reflective components for spatially multiplexed LOS communication as described herein. For example, some operations described as being performed by a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit, which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

Wireless communications system 100 may support enable an increased effective aperture size and thus a larger achievable quantity of layers per polarization for spatial multiplexing in MIMO communications. That is, wireless communications system 100 may enable a transmitting device (e.g., a UE 115 or a network entity 105) and a receiving device (e.g., a UE 115 or a network entity 105) to increase effective aperture sizes of transmitting antenna arrays 190 and receiving antenna arrays 190, respectively (e.g., without increasing physical aperture sizes and thus increasing the cost of implementation). For example, one or both of the transmitting device and the receiving device may use a reflective component 185 to reflect signals between the devices. The reflective component 185 may magnify the transmitting antenna arrays 190 and the receiving antenna arrays 190, which may result in larger effective aperture sizes of the transmitting antenna arrays 190 and the receiving antenna arrays 190 without increasing a physical distance between antenna elements in the antenna subarrays.

Figure 2:
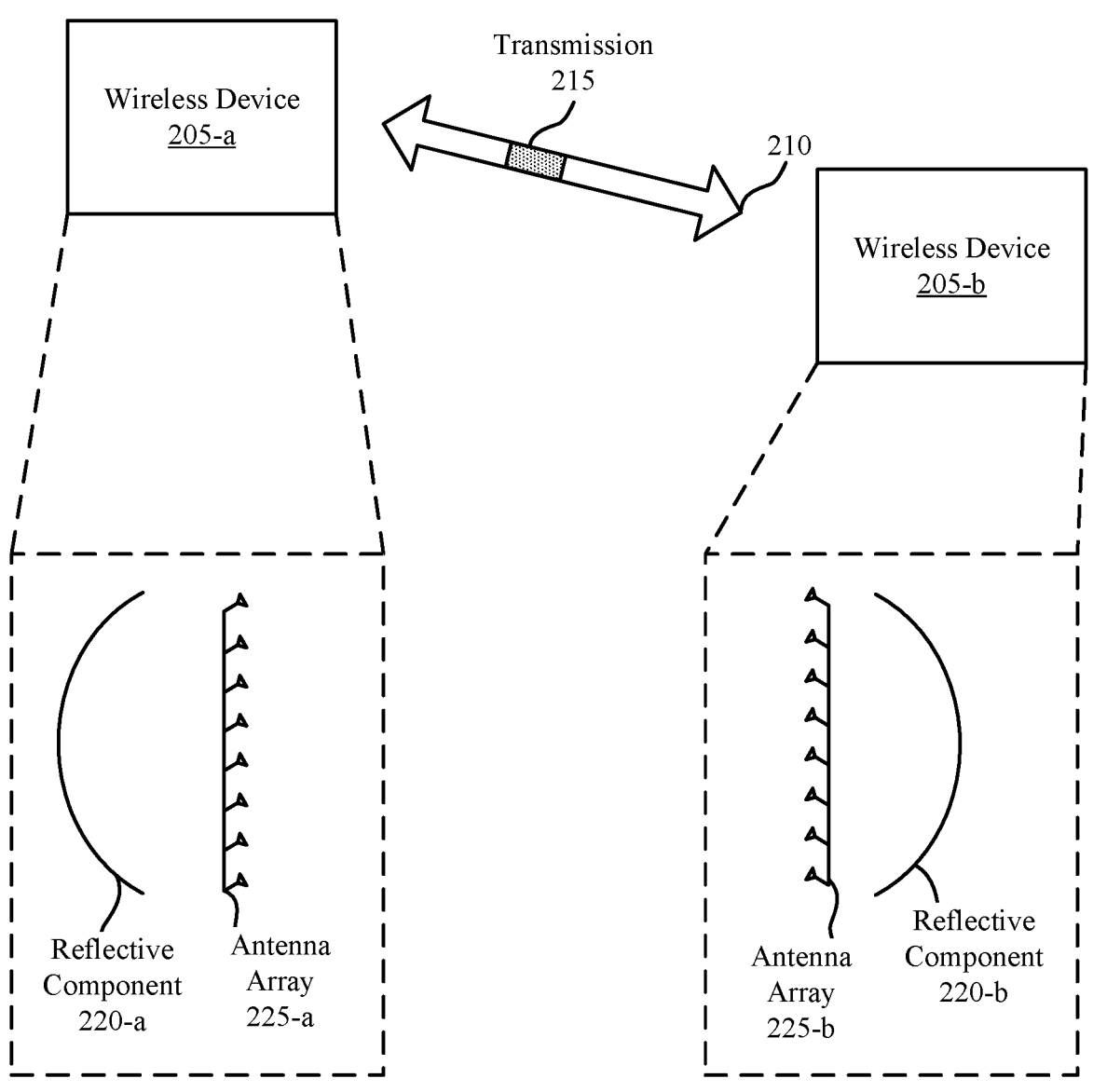
FIG. 2 shows an example of a wireless communications system that supports aperture magnification using reflective components for spatially multiplexed LOS communication in accordance with one or more aspects of the present disclosure.

FIG. 2 shows an example of a wireless communications system 200 that supports aperture magnification using reflective components for spatially multiplexed LOS communication in accordance with one or more aspects of the present disclosure. The wireless communications system 200 may implement or may be implemented by some aspects of the wireless communications system 100. For example, the wireless communications system 200 may include one or more wireless devices (e.g., a wireless device 205-a and a wireless device 205-b), which may be examples of UEs 115 or network entities 105 as described with reference to FIG. 1.

In some wireless communications systems (e.g., wireless fronthaul or backhaul deployments), wireless devices 205 may communicate using LOS communication techniques. That is, a wireless device 205-a and a wireless device 205-b may communicate one or more transmissions 215 via a channel 210 when there is a relatively clear (e.g., LOS) path between the wireless device 205-a and the wireless device 205-b (e.g., when there are few or minimal obstructions in the channel 210). In some examples, the wireless device 205-a may be a transmitting wireless device 205-a with one or more transmitting antenna arrays 225-a, and the wireless device 205-b may be a receiving wireless device 205-b with one or more receiving antenna arrays 225-b. The antenna array 225-a and the antenna array 225-b may have various antenna array configurations (linear, circular, planar, etc.). The wireless device 205-a and the wireless device 205-b may communicate in high frequency bands (e.g., mmW or sub-terahertz (THz) frequency bands) using spatially multiplexed communications (e.g., with more than one spatial layer per polarization state).

In some examples, a channel capacity of the wireless communications system 200 may depend on respective aperture sizes associated with the antenna array 225-a and the antenna array 225-b. For example, if the antenna array 225-a and the antenna array 225-b have larger aperture sizes (e.g., larger distances between respective antenna elements of each antenna array 225), the wireless device 205-a and the wireless device 205-b may communicate using a larger rank of spatially multiplexed MIMO communications as compared to wireless devices 205 with smaller aperture sizes. That is, an achievable rank of spatially multiplexed communications for a given distance between the wireless device 205-a and the wireless device 205-b may be proportional to the respective aperture sizes of the antenna array 225-a and the antenna array 225-b. The achievable rank of spatially multiplexed communications (e.g., a quantity of degrees of freedom of LOS communications) may additionally or alternatively depend on a distance between the wireless device 205-a and the wireless device 205-b. For example, if the antenna array 225-a and the antenna array 225-b are uniform linear arrays (ULAs), the achievable rank may be defined as $$\frac{a_t a_r}{\lambda R},$$

where $a_t$ may be an aperture length of the transmitting antenna array 225-a, $a_r$ may be an aperture length of the receiving antenna array 225-b, and $\lambda$ may be the distance between the transmitting antenna array 225-a and the receiving antenna array 225-b, and A may be a wavelength of the spatially multiplexed communications. Thus, to achieve a target rank of spatially multiplexed communications for a given distance R, the wireless device 205-a and the wireless device 205-b may have antenna arrays 225 with larger aperture sizes.

However, large antenna spacing associated with larger aperture sizes may be associated with hardware costs such as longer cables between antenna arrays, PLLs, phase rotators, increased amount of materials, and other hardware and processing costs. That is, longer cables between antenna elements may be result in higher RF power losses than shorter cables. To mitigate the RF power losses, the wireless device 205-a and the wireless device 205-b may perform up conversion and down conversion to convert transmissions 215 to infrared frequency (IF) signals, which may be associated with relatively less power losses than RF signals. The wireless device 205-a and the wireless device 205-b may, additionally, or alternatively, use PLLs to synthesize local oscillator (LO) signals for each subarray, which may increase a complexity of a LO routing network. Antenna arrays 225 with larger aperture sizes may further experience more link loss than antenna arrays 225 with smaller aperture sizes (e.g., as a result of higher frequencies and larger distances between antenna elements). Accordingly, the wireless device 205-a and the wireless device 205-b may use more complex hardware (e.g., phase rotators) to mitigate the link loss. Such hardware costs and complexity may increase a cost of implementation of the wireless communications system 200 as compared to wireless devices 205 with smaller aperture sizes, which may use antenna elements that are integrated in one RF chip (e.g., and thus have a smaller hardware cost).

Accordingly, one or both of the wireless device 205-*a* and the wireless device 205-*b* may use one or more reflective components 220 (e.g., a reflective component 220-*a* and a reflective component 220-*b*, respectively) to produce images of the antenna array 225-*a* and the antenna array 225-*b* with larger aperture sizes than physical aperture sizes of the antenna array 225-*a* and the antenna array 225-*b*. That is, the reflective component 220-*a* and the reflective component 220-*b* may be concave mirrors that may increase (e.g., magnify) an effective distance between antenna elements of the antenna array 225-*a* and the antenna array 225-*b*, respectively.

Communications between the wireless device 205-*a* and the wireless device 205-*b* via reflection from one or more reflective components 220 may be equivalent to (e.g., may have an equal or larger achievable rank as) LOS communications between mirror images of the antenna array 225-*a* and the antenna array 225-*b*. Thus, the rank of the spatially multiplexed communications achievable with the one or more reflective components 220 may be larger than the rank of spatially multiplexed communications achievable without the one or more reflective components 220 for given aperture sizes and a given distance R. The wireless device 205-*a* and the wireless device 205-*b* may accordingly achieve a target rank of spatially multiplexed communications using antenna arrays 225 which may be integrated in one RF chip, and may therefore reduce signal loss and hardware costs associated with long cables and complex LO routing networks.

In some examples, a spacing of antenna elements in the antenna array 225-*a* and the antenna array 225-*b* which may achieve the target rank of spatially multiplexed communications may depend on a deployment scenario of the wireless device 205-*a* and the wireless device 205-*b* (e.g., a distance between the wireless device 205-*a* and the wireless device 205-*b* which may not be known during manufacturing). Further, beamforming capabilities of the wireless device 205-*a* and the wireless device 205-*b* may depend on a quantity of antenna elements within an antenna panel of the wireless device 205-*a* and the wireless device 205-*b*. That is, the wireless device 205-*a* and the wireless device 205-*b* may use a larger quantity of antenna elements than some other wireless devices 205 to increase a beamforming and beam steering capability of the wireless device 205-*a* and the wireless device 205-*b*.

Accordingly, one or both of the reflective component 220-*a* and the reflective component 220-*b* may be a RIS. That is, the reflective component 220-*a* or the reflective component 220-*b* may be an array of reflective elements with reflective properties which may be dynamically adjusted (e.g., reconfigured) to control a reflection and scattering of electromagnetic waves. The wireless device 205-*a* or the wireless device 205-*b* may accordingly select a reflective property of a RIS (e.g., a weight vector associated with a focal point and magnification factor of the RIS) to achieve an effective aperture size of the antenna array 225-*a* or the antenna array 225-*b*, respectively, which may achieve the target rank for spatially multiplexed communications.

The wireless device 205-*a* or the wireless device 205-*b* may additionally or alternatively use the RIS to perform beamforming with fewer antenna elements than wireless devices 205 without a RIS. That is, the wireless device 205-*a* or the wireless device 205-*b* may use the RIS to steer one or more beams electronically (e.g., by adjusting a pointing angle of the RIS). Such beam steering techniques may allow the wireless device 205-*a* or the wireless device 205-*b* to perform communications with multiple wireless devices 205 in various directions and with various distances R using fewer antenna elements than a wireless device 205 without a RIS.

Figure 3:
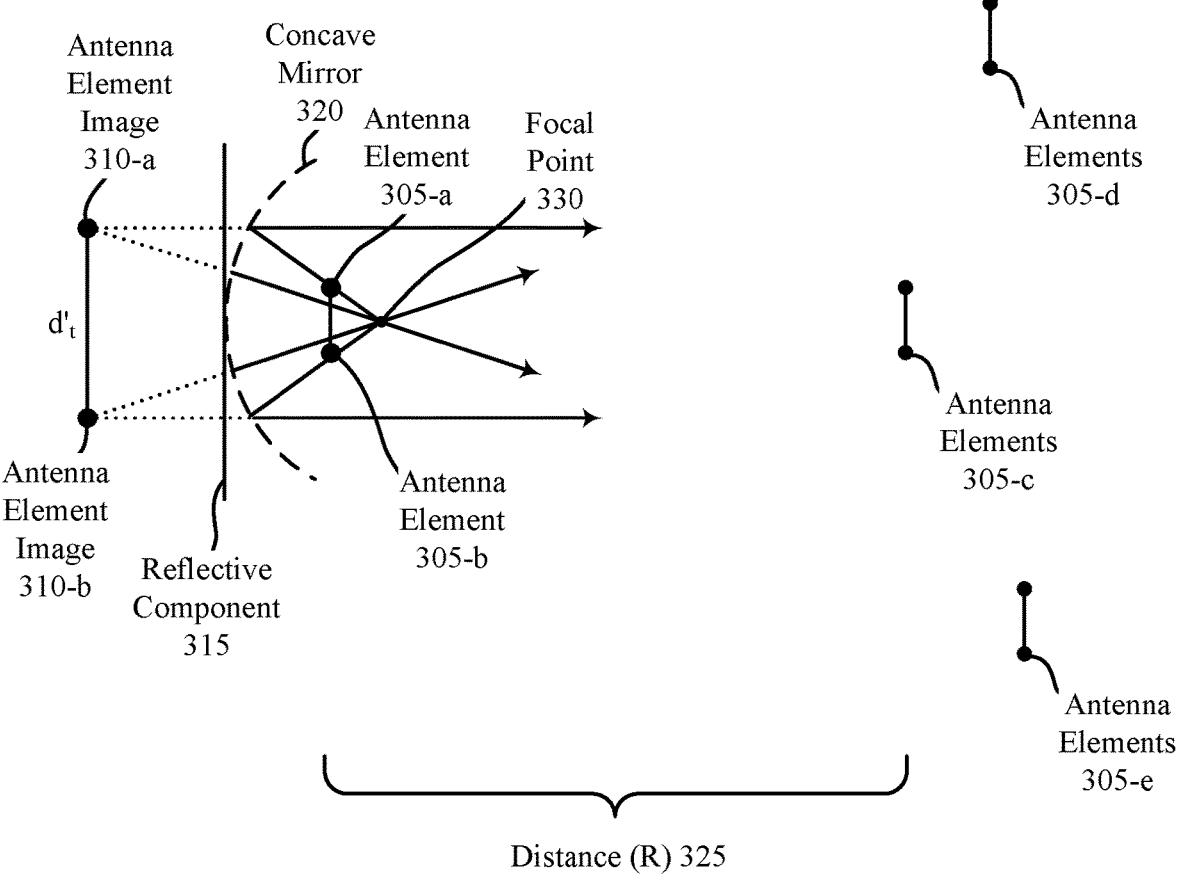
FIG. 3 shows an example of an optical component diagram that supports aperture magnification using reflective components for spatially multiplexed LOS communication in accordance with one or more aspects of the present disclosure.

FIG. 3 shows an example of an optical component diagram 300 that supports aperture magnification using reflective components for spatially multiplexed LOS communication in accordance with one or more aspects of the present disclosure. The optical component diagram 300 may implement or may be implemented by some aspects of the wireless communications system 100 or the wireless communications system 200. For example, the optical component diagram 300 may include one or more wireless devices, which may be examples of UEs 115 or network entities 105 as described with reference to FIG. 1.

In spatially multiplexed MIMIO communications, a transmitting wireless device may transmit one or more signals to one or more receiving wireless devices using one or more transmitting antenna elements 305 (e.g., an antenna element 305-*a* and an antenna element 305-*b*). In some examples, an achievable rank of spatially multiplexed communications associated with the one or more signals may depend on an aperture size of the transmitting antenna elements 305 (e.g., a distance between the antenna element 305-*a* and the antenna element 305-*b*), an aperture size of a set of receiving antenna elements 305 of a receiving device (e.g., antenna elements 305-*c*), and a distance 325 between the transmitting antenna elements 305 and the receiving antenna elements 305. That is, if the transmitting antenna elements 305 and the receiving antenna elements 305 are ULAs, the achievable rank may be defined as $$\frac{a_t a_r}{\lambda R},$$

where $a_t$ may be an aperture length of the transmitting antenna elements 305, $a_r$ may be an aperture length of the receiving antenna elements 305, R may be the distance 325, and $\lambda$ may be a wavelength associated with the spatially multiplexed communications.

Accordingly, to increase the achievable rank of spatially multiplexed communications to meet a target rank, the transmitting device may increase an effective aperture size of the transmitting antenna elements 305 (e.g., or the receiving antenna elements 305, as viewed from the transmitting device) using a reflective component 315. In some examples, the reflective component 315 may be a concave mirror 320 with a focal point 330. In some examples, the reflective component 315 may be a RIS. In such examples, the transmitting device may adjust a reflective property of one or more reflective components of the RIS to cause the RIS to act as the concave mirror 320 with the focal point 330.

In some examples (e.g., if the reflective component 315 is the RIS), the transmitting device may select or adjust a focal point 330 to magnify the aperture size of the transmitting antenna elements 305 to a target aperture size. That is, the RIS may have multiple weight vectors, which may each be associated with a different focal point (e.g., and a different magnification ratio G, which may determine an enlargement of the aperture size). In some examples, the transmitting device may adjust a reflective property of the RIS to select a focal point 330 that may achieve a virtual antenna spacing d'$_t$ between an antenna element image 310-$a$ and an antenna element image 310-$b$ (e.g., images of the antenna element 305-$a$ and the antenna element 305-$b$, respectively, as reflected by the reflective component 315). The distance d'$_t$ may enable the transmitting device to achieve the target rank for a specific deployment scenario (e.g., a specific distance between the transmitting device and the receiving device). In some examples, the distance d'$_t$ which may achieve the target rank may be defined as $$d'_t = \frac{\lambda R}{2d_r},$$

where R may be a distance between the antenna element images 310 (e.g., the antenna element image 310-$a$ and the antenna element image 310-$b$) and the receiving antenna elements 305, and d$_r$ may be a distance between the antenna element 305-$a$ and the antenna element 305-$b$ (e.g., without magnification from the reflective component 315). In some examples, the distance d'$_t$ may not be larger than a length of the reflective component 315.

In some examples, the transmitting device may select or adjust an orientation of the reflective component 315. That is, the transmitting device may steer the reflective component 315 to allow the transmitting device to transmit signaling from the antenna element 305-$a$ and the antenna element 305-$b$ to one or more of the antenna elements 305-$c$, antenna elements 305-$d$, and antenna elements 305-$e$. The transmitting device may select an orientation of the reflective component 315 that may result in a target performance of communications (e.g., the target rank or a target signal quality). The transmitting device may determine a performance of communications by exchanging channel information (e.g., channel quality information) with the receiving device. Such techniques may allow the transmitting device to increase a directivity associated with the transmitting antenna elements 305 and to perform beamforming and beam steering with relatively fewer antenna elements 305 than a transmitting device without a reflective component 315.

Although the techniques are described herein with reference to the transmitting device, the receiving device may additionally or alternatively perform the spatially multiplexed communications (e.g., transmissions or receptions) using a reflective component 315 to achieve the benefits described herein. That is, the receiving device may increase an effective aperture size of receiving antenna elements 305 and perform beam steering with a reflective component 315, which may be a concave mirror 320 or a RIS. In some examples, both of the receiving device and the transmitting device may perform spatially multiplexed communications by reflecting signaling from one or more reflective components 315. Such techniques may allow for the transmitting device and the receiving device to achieve the target rank of spatially multiplexed communications using smaller physical antenna arrays (e.g., with linear, circular, planar, or other antenna array configurations) without hardware costs associated with larger physical antenna arrays.

Figure 4:
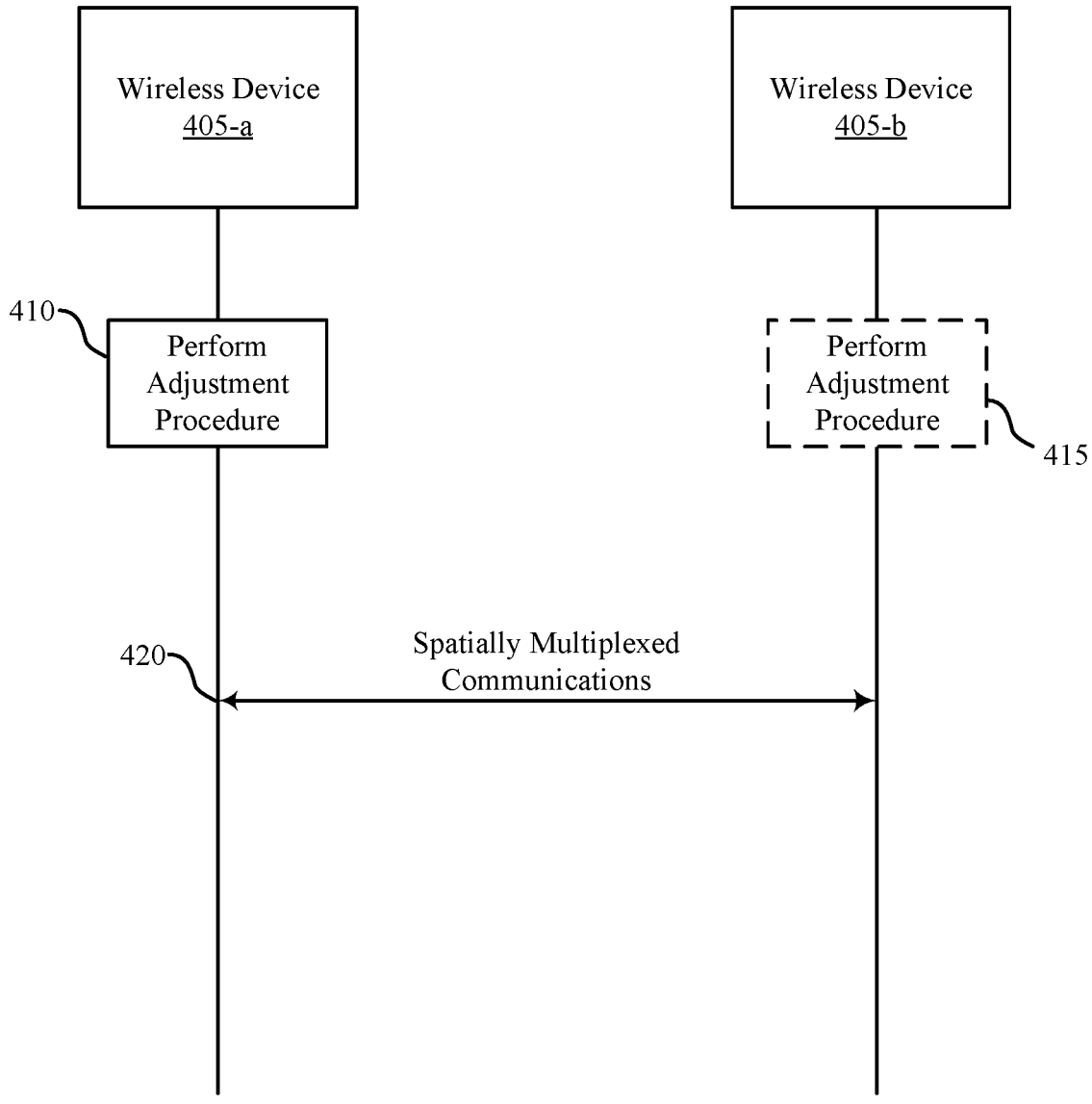
FIG. 4 shows an example of a process flow that supports aperture magnification using reflective components for spatially multiplexed LOS communication in accordance with one or more aspects of the present disclosure.

FIG. 4 shows an example of a process flow 400 that supports aperture magnification using reflective components for spatially multiplexed LOS communication in accordance with one or more aspects of the present disclosure. The process flow 400 may implement or may be implemented by some aspects of the wireless communications system 100, the wireless communications system 200, or the optical component diagram 300. For example, the process flow 400 may include one or more wireless devices (e.g., a wireless device 405-$a$ and a wireless device 405-$b$), which may be examples of UEs 115 or network entities 105 as described with reference to FIG. 1.

In the following description of the process flow 400, the operations between the wireless device 405-$a$ and the wireless device 405-$b$ may occur in a different order than the example order shown. Some operations may also be omitted from the process flow 400, and other operations may be added to the process flow 400. Further, although some operations or signaling may be shown to occur at different times for discussion purposes, these operations may actually occur at the same time.

At 410, the wireless device 405-$a$ may perform an adjustment procedure to adjust a reflective component of the wireless device 405-$a$. The wireless device 405-$a$ may perform the adjustment procedure, for example, to achieve a target rank of spatially multiplexed communications between the wireless device 405-$a$ and the wireless device 405-$b$. In some examples, the reflective component may be a concave mirror with a focal point which may enable the wireless device 405-$a$ to communicate using the target rank. In some examples, the reflective component may be a RIS that may act as a concave mirror. For example, the RIS may have a set of weight vectors each associated with a focal point of a concave mirror that the RIS may act as.

In some examples, the adjustment procedure may include adjusting reflective properties of one or more reflective elements of the RIS. That is, the RIS may receive a configuration or a command from the wireless device 405-$a$ to adjust the reflective properties to cause the RIS to act as a concave mirror. The RIS may accordingly adjust a weight vector of the RIS to be a first weight vector of the set of weight vectors. The first weight vector may be associated with a focal point of the concave mirror. In some examples, the RIS may adjust the reflective property of the reflective elements to increase one or more first effective distances between antenna elements of a first set of antenna elements of the wireless device 405-$a$. In some examples, the RIS may adjust the reflective property of the reflective elements to increase one or more second effective distances between antenna elements of a second set of antenna elements of the wireless device 405-$b$ (e.g., from the perspective of the wireless device 405-$a$). The first effective distances and the second effective distances may be aperture sizes associated with the target rank (e.g., based on a distance between the wireless device 405-$a$ and the wireless device 405-$b$).

In some examples, the adjustment procedure may include adjusting an orientation of the reflective component. For example, the wireless device 405-$a$ may adjust an orientation of the reflective component to increase a quality of the spatially multiplexed communications based on a location of the wireless device 405-$b$. That is, the wireless device 405-$a$ may adjust the orientation based on a position of the first set of antenna elements and a position of the second set of antenna elements.

In some examples, at 415, the wireless device 405-$b$ may perform an adjustment procedure of a reflective component of the wireless device 405-$b$. That is, the wireless device may adjust a reflective property of the reflective component or an orientation of the reflective component, as described with reference to step 410.

At 420, the wireless device 405-$a$ and the wireless device 405-$b$ may perform the spatially multiplexed communications. That is, the wireless device 405-*a* may transmit or receive one or more signals to or from the wireless device 405-*b* by reflecting the one or more signals via the reflective component of the wireless device 405-*a* (e.g., and a reflective component of the wireless device 405-*b*). For example, if the first set of antenna elements is a set of transmitting antenna elements and the second set of antenna elements is a set of receiving antenna elements, the wireless device 405-*a* may transmit one or more signals to the wireless device 405-*b*. If the first set of antenna elements is a set of receiving antenna elements and the second set of antenna elements is a set of transmitting antenna elements, the wireless device 405-*b* may transmit one or more signals to the wireless device 405-*a*.

In some examples, a rank of the spatially multiplexed communications may be the target rank. The rank of the spatially multiplexed communications may be greater than a rank of spatially multiplexed communications achievable without reflection via the reflective component. The rank of spatially multiplexed communications achievable without reflection via the reflective component may be based on one or more of distances between antenna elements of the first set of antenna elements, distances between antenna elements of the second set of antenna elements, or the distance between the first set of antenna elements and the second set of antenna elements.

Figure 5:
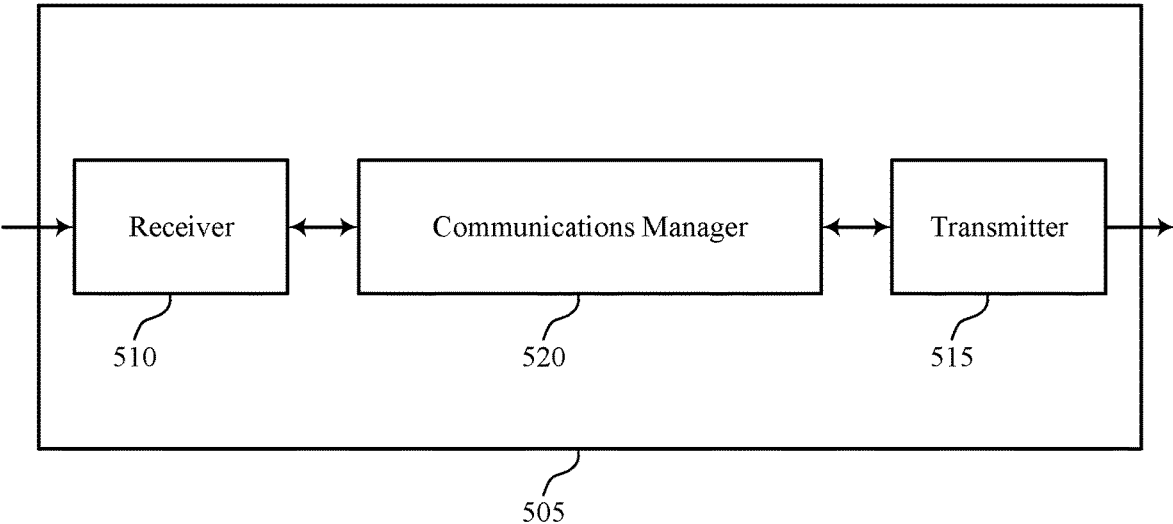
FIGS. 5 and 6 show block diagrams of devices that support aperture magnification using reflective components for spatially multiplexed LOS communication in accordance with one or more aspects of the present disclosure.
Figure 5:

FIG. 5 shows a block diagram 500 of a device 505 that supports aperture magnification using reflective components for spatially multiplexed LOS communication in accordance with one or more aspects of the present disclosure. The device 505 may be an example of aspects of a wireless device (e.g., a UE, a network entity) as described herein. The device 505 may include a receiver 510, a transmitter 515, and a communications manager 520. The device 505, or one or more components of the device 505 (e.g., the receiver 510, the transmitter 515, and the communications manager 520), may include at least one processor, which may be coupled with at least one memory, to, individually or collectively, support or enable the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to aperture magnification using reflective components for spatially multiplexed LOS communication). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to aperture magnification using reflective components for spatially multiplexed LOS communication). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of aperture magnification using reflective components for spatially multiplexed LOS communication as described herein. For example, the communications manager 520, the receiver 510, the transmitter 515, or various combinations or components thereof may be capable of performing one or more of the functions described herein.

In some examples, the communications manager 520, the receiver 510, the transmitter 515, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 520, the receiver 510, the transmitter 515, or various combinations or components thereof may be implemented in code (e.g., as communications management software or firmware) executed by at least one processor. If implemented in code executed by at least one processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. For example, the communications manager 520 is capable of, configured to, or operable to support a means for performing an adjustment procedure associated with a reflective component of the first wireless device based on a target rank for spatially multiplexed communications between the first wireless device and a second wireless device. The communications manager 520 is capable of, configured to, or operable to support a means for performing the spatially multiplexed communications with the second wireless device using the reflective component based on the adjustment procedure and in accordance with the target rank, where the target rank of the spatially multiplexed communications is greater than a rank of spatially multiplexed communications that is achievable without reflection via the reflective component.

By including or configuring the communications manager 520 in accordance with examples as described herein, the device 505 (e.g., at least one processor controlling or otherwise coupled with the receiver 510, the transmitter 515, the communications manager 520, or a combination thereof) may support techniques for spatially multiplexed communications using reflective components to increase an achievable rank of the spatially multiplexed communications, which may allow for decreased hardware costs of LOS communications.

Figure 6:
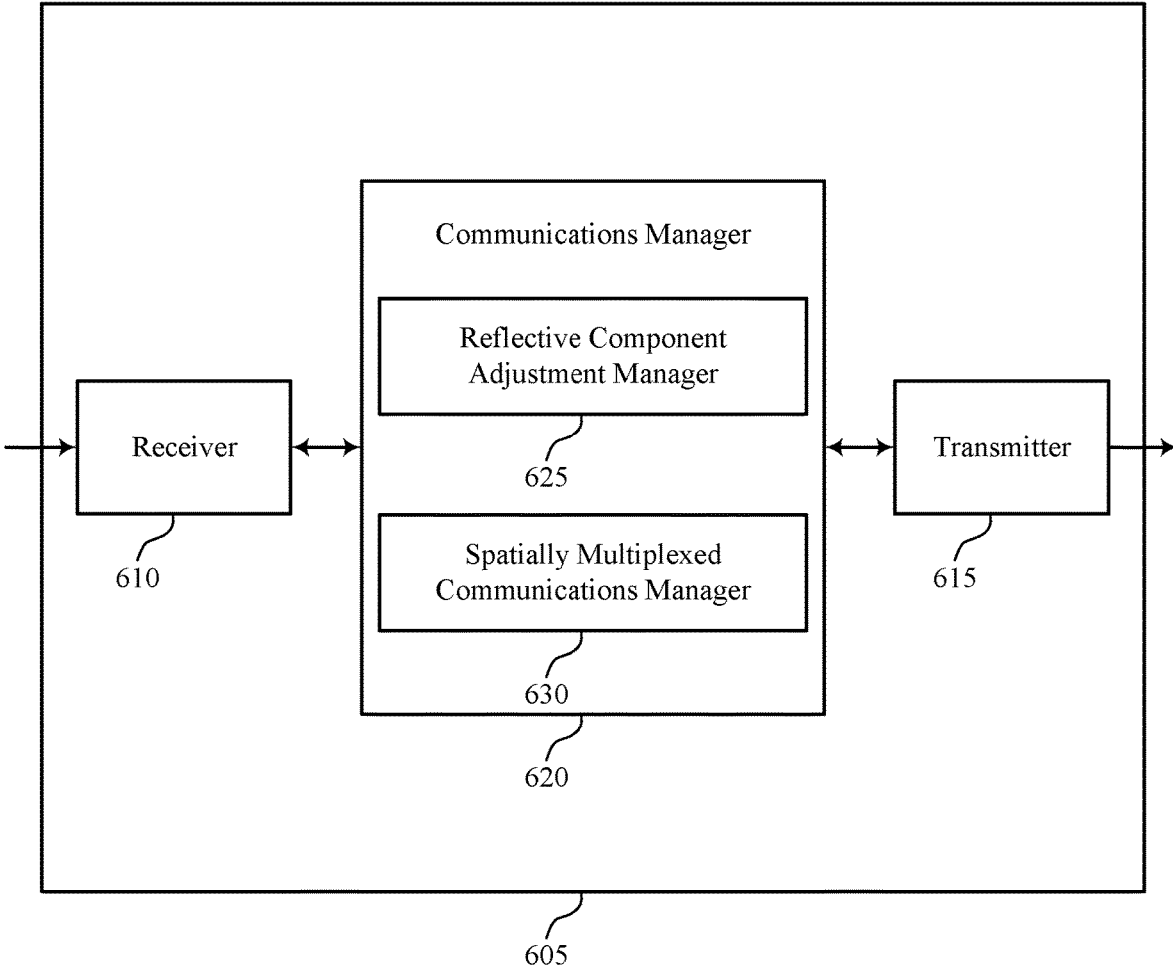

FIG. 6 shows a block diagram 600 of a device 605 that supports aperture magnification using reflective components for spatially multiplexed LOS communication in accordance with one or more aspects of the present disclosure. The device 605 may be an example of aspects of a device 505 or a wireless device (e.g., a UE, a network entity) as described herein. The device 605 may include a receiver 610, a transmitter 615, and a communications manager 620. The device 605, or one or more components of the device 605 (e.g., the receiver 610, the transmitter 615, and the communications manager 620), may include at least one processor, which may be coupled with at least one memory, to support the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to aperture magnification using reflective components for spatially multiplexed LOS communication). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to aperture magnification using reflective components for spatially multiplexed LOS communication). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of aperture magnification using reflective components for spatially multiplexed LOS communication as described herein. For example, the communications manager 620 may include a reflective component adjustment manager 625 a spatially multiplexed communications manager 630, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. The reflective component adjustment manager 625 is capable of, configured to, or operable to support a means for performing an adjustment procedure associated with a reflective component of the first wireless device based on a target rank for spatially multiplexed communications between the first wireless device and a second wireless device. The spatially multiplexed communications manager 630 is capable of, configured to, or operable to support a means for performing the spatially multiplexed communications with the second wireless device using the reflective component based on the adjustment procedure and in accordance with the target rank, where the target rank of the spatially multiplexed communications is greater than a rank of spatially multiplexed communications that is achievable without reflection via the reflective component.

Figure 7:
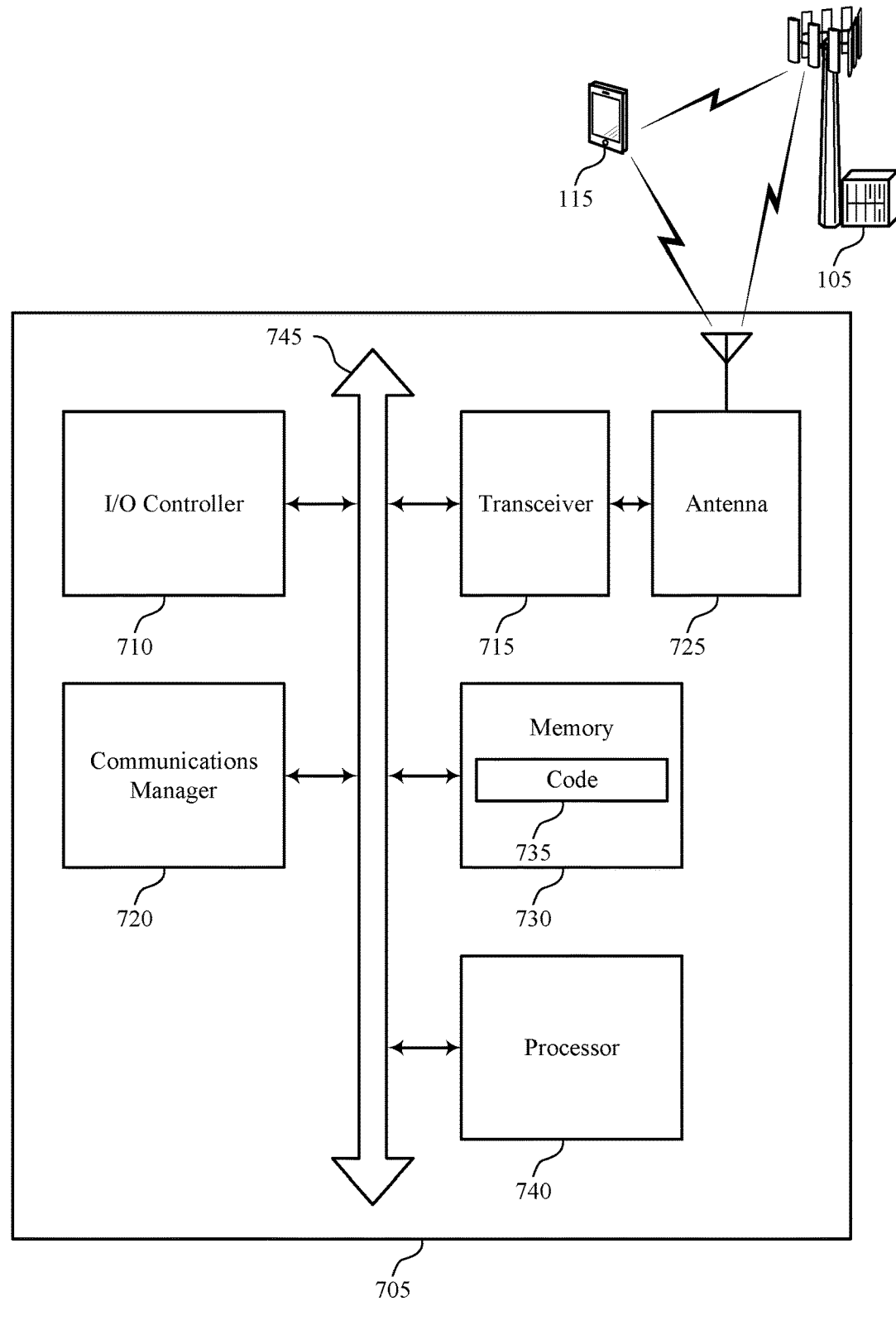
FIG. 7 shows a block diagram of a communications manager that supports aperture magnification using reflective components for spatially multiplexed LOS communication in accordance with one or more aspects of the present disclosure.

FIG. 7 shows a block diagram 700 of a communications manager 720 that supports aperture magnification using reflective components for spatially multiplexed LOS communication in accordance with one or more aspects of the present disclosure. The communications manager 720 may be an example of aspects of a communications manager 520, a communications manager 620, or both, as described herein. The communications manager 720, or various components thereof, may be an example of means for performing various aspects of aperture magnification using reflective components for spatially multiplexed LOS communication as described herein. For example, the communications manager 720 may include a reflective component adjustment manager 725 a spatially multiplexed communications manager 730, or any combination thereof. Each of these components, or components or subcomponents thereof (e.g., one or more processors, one or more memories), may communicate, directly or indirectly, with one another (e.g., via one or more buses).

The communications manager 720 may support wireless communications in accordance with examples as disclosed herein. The reflective component adjustment manager 725 is capable of, configured to, or operable to support a means for performing an adjustment procedure associated with a reflective component of the first wireless device based on a target rank for spatially multiplexed communications between the first wireless device and a second wireless device. The spatially multiplexed communications manager 730 is capable of, configured to, or operable to support a means for performing the spatially multiplexed communications with the second wireless device using the reflective component based on the adjustment procedure and in accordance with the target rank, where the target rank of the spatially multiplexed communications is greater than a rank of spatially multiplexed communications that is achievable without reflection via the reflective component.

In some examples, the reflective component is a RIS and, to support performing the adjustment procedure, the reflective component adjustment manager 725 is capable of, configured to, or operable to support a means for adjusting a reflective property of reflective elements of the RIS based on the target rank of the spatially multiplexed communications, where performing the spatially multiplexed communications is based on adjusting the reflective property.

In some examples, the RIS is associated with a set of multiple weight vectors and, to support adjusting the reflective property of the reflective elements, the reflective component adjustment manager 725 is capable of, configured to, or operable to support a means for adjusting a weight vector of the RIS to be a first weight vector of the set of multiple weight vectors to cause the RIS to act as a concave mirror, where a focal point of the concave mirror is based on the first weight vector of the set of multiple weight vectors.

In some examples, to support adjusting the reflective property of the reflective elements of the RIS, the reflective component adjustment manager 725 is capable of, configured to, or operable to support a means for adjusting the reflective property of the reflective elements of the RIS to increase one or more first effective distances between antenna elements of a first set of antenna elements of the first wireless device or one or more second effective distances between antenna elements of a second set of antenna elements of the second wireless device based on a focal point of the RIS, where the one or more first effective distances and the one or more second effective distances are based on the target rank of the spatially multiplexed communications.

In some examples, to support performing the adjustment procedure, the reflective component adjustment manager 725 is capable of, configured to, or operable to support a means for adjusting an orientation of the reflective component based on a first position of a first set of antenna elements of the first wireless device and a second position of a second set of antenna elements of the second wireless device, where performing the spatially multiplexed communications is based on adjusting the orientation.

In some examples, the rank of spatially multiplexed communications that is achievable without reflection via the reflective component is based on one or more first distances between antenna elements of a first set of antenna elements of the first wireless device, one or more second distances between antenna elements of a second set of antenna elements of the second wireless device, and a third distance between the first set of antenna elements and the second set of antenna elements.

In some examples, a focal point of the reflective component is based on the target rank of the spatially multiplexed communications.

In some examples, to support performing the spatially multiplexed communications, the spatially multiplexed communications manager 730 is capable of, configured to, or operable to support a means for performing the spatially multiplexed communications with the second wireless device in accordance with a second reflective component of the second wireless device.

In some examples, a first set of antenna elements of the first wireless device is a set of transmitting antenna elements and a second set of antenna elements of the second wireless device is a set of receiving antenna elements.

In some examples, a first set of antenna elements of the first wireless device is a set of receiving antenna elements and a second set of antenna elements of the second wireless device is a set of transmitting antenna elements.

In some examples, the reflective component is a concave mirror.

Figure 8:
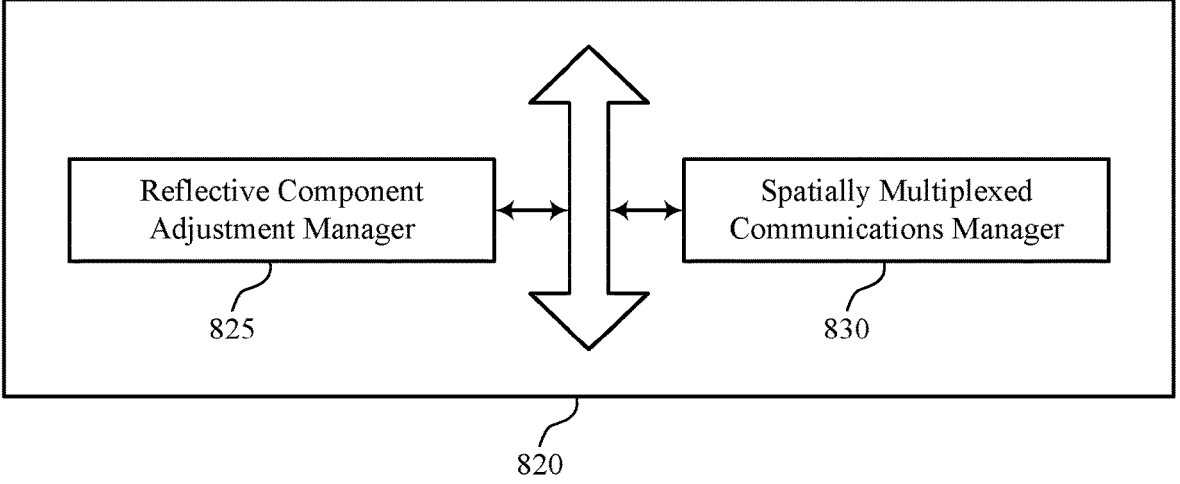
FIG. 8 shows a diagram of a system including a device that supports aperture magnification using reflective components for spatially multiplexed LOS communication in accordance with one or more aspects of the present disclosure.

FIG. 8 shows a diagram of a system 800 including a device 805 that supports aperture magnification using reflective components for spatially multiplexed LOS communication in accordance with one or more aspects of the present disclosure. The device 805 may be an example of or include the components of a device 505, a device 605, or a wireless device (e.g., a UE, a network entity) as described herein. The device 805 may include components for bi-directional voice and data communications including components for transmitting and receiving communications, such as a communications manager 820, an I/O controller 810, a transceiver 815, an antenna 825, at least one memory 830, code 835, and at least one processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of one or more processors, such as the at least one processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The at least one memory 830 may include RAM and ROM. The at least one memory 830 may store computer-readable, computer-executable code 835 including instructions that, when executed by the at least one processor 840, cause the device 805 to perform various functions described herein. The code 835 may be stored in a non-transitory computer-readable medium such as system memory or another type of memory. In some cases, the code 835 may not be directly executable by the at least one processor 840 but may cause a computer (e.g., when compiled and executed) to perform functions described herein. In some cases, the at least one memory 830 may contain, among other things, a BIOS which may control basic hardware or software operation such as the interaction with peripheral components or devices.

The at least one processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 840 may be configured to operate a memory array using a memory controller. In some other cases, a memory controller may be integrated into the at least one processor 840. The at least one processor 840 may be configured to execute computer-readable instructions stored in a memory (e.g., the at least one memory 830) to cause the device 805 to perform various functions (e.g., functions or tasks supporting aperture magnification using reflective components for spatially multiplexed LOS communication). For example, the device 805 or a component of the device 805 may include at least one processor 840 and at least one memory 830 coupled with or to the at least one processor 840, the at least one processor 840 and at least one memory 830 configured to perform various functions described herein. In some examples, the at least one processor 840 may include multiple processors and the at least one memory 830 may include multiple memories. One or more of the multiple processors may be coupled with one or more of the multiple memories, which may, individually or collectively, be configured to perform various functions herein.

The communications manager 820 may support wireless communications in accordance with examples as disclosed herein. For example, the communications manager 820 is capable of, configured to, or operable to support a means for performing an adjustment procedure associated with a reflective component of the first wireless device based on a target rank for spatially multiplexed communications between the first wireless device and a second wireless device. The communications manager 820 is capable of, configured to, or operable to support a means for performing the spatially multiplexed communications with the second wireless device using the reflective component based on the adjustment procedure and in accordance with the target rank, where the target rank of the spatially multiplexed communications is greater than a rank of spatially multiplexed communications that is achievable without reflection via the reflective component.

By including or configuring the communications manager 820 in accordance with examples as described herein, the device 805 may support techniques for spatially multiplexed communications using reflective components to increase an achievable rank of the spatially multiplexed communications, which may allow for improved communication reliability, improved user experience related to reduced processing, improved utilization of processing capability, reduced hardware costs, and increased communication performance as a result of the increased rank of the spatially multiplexed communications.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the at least one processor 840, the at least one memory 830, the code 835, or any combination thereof. For example, the code 835 may include instructions executable by the at least one processor 840 to cause the device 805 to perform various aspects of aperture magnification using reflective components for spatially multiplexed LOS communication as described herein, or the at least one processor 840 and the at least one memory 830 may be otherwise configured to, individually or collectively, perform or support such operations.

Figure 9:
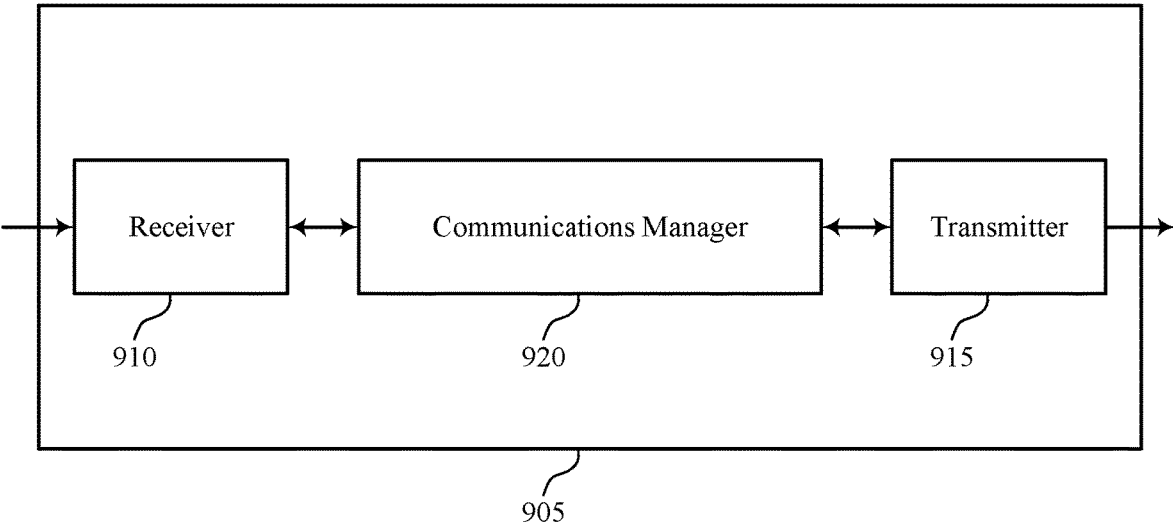
FIGS. 9 and 10 show block diagrams of devices that support aperture magnification using reflective components for spatially multiplexed LOS communication in accordance with one or more aspects of the present disclosure.

FIG. 9 shows a block diagram 900 of a device 905 that supports aperture magnification using reflective components for spatially multiplexed LOS communication in accordance with one or more aspects of the present disclosure. The device 905 may be an example of aspects of a RIS as described herein. The device 905 may include a receiver 910, a transmitter 915, and a communications manager 920. The device 905, or one or more components of the device 905 (e.g., the receiver 910, the transmitter 915, and the communications manager 920), may include at least one processor, which may be coupled with at least one memory, to, individually or collectively, support or enable the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of aperture magnification using reflective components for spatially multiplexed LOS communication as described herein. For example, the communications manager 920, the receiver 910, the transmitter 915, or various combinations or components thereof may be capable of performing one or more of the functions described herein.

In some examples, the communications manager 920, the receiver 910, the transmitter 915, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 920, the receiver 910, the transmitter 915, or various combinations or components thereof may be implemented in code (e.g., as communications management software or firmware) executed by at least one processor. If implemented in code executed by at least one processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. For example, the communications manager 920 is capable of, configured to, or operable to support a means for performing an adjustment procedure of the RIS based on a target rank for spatially multiplexed communications between a first wireless device and a second wireless device. The communications manager 920 is capable of, configured to, or operable to support a means for reflecting at least one signal between a first set of antenna elements of the first wireless device and a second set of antenna elements of the second wireless device, where spatially multiplexed communications associated with reflection of the at least one signal are in accordance with the target rank, and where the target rank of the spatially multiplexed communications is greater than a rank of spatially multiplexed communications that is achievable without reflection via the RIS.

By including or configuring the communications manager 920 in accordance with examples as described herein, the device 905 (e.g., at least one processor controlling or otherwise coupled with the receiver 910, the transmitter 915, the communications manager 920, or a combination thereof) may support techniques for spatially multiplexed communications using reflective components to increase an achievable rank of the spatially multiplexed communications, which may allow for decreased hardware costs of LOS communications.

Figure 10:
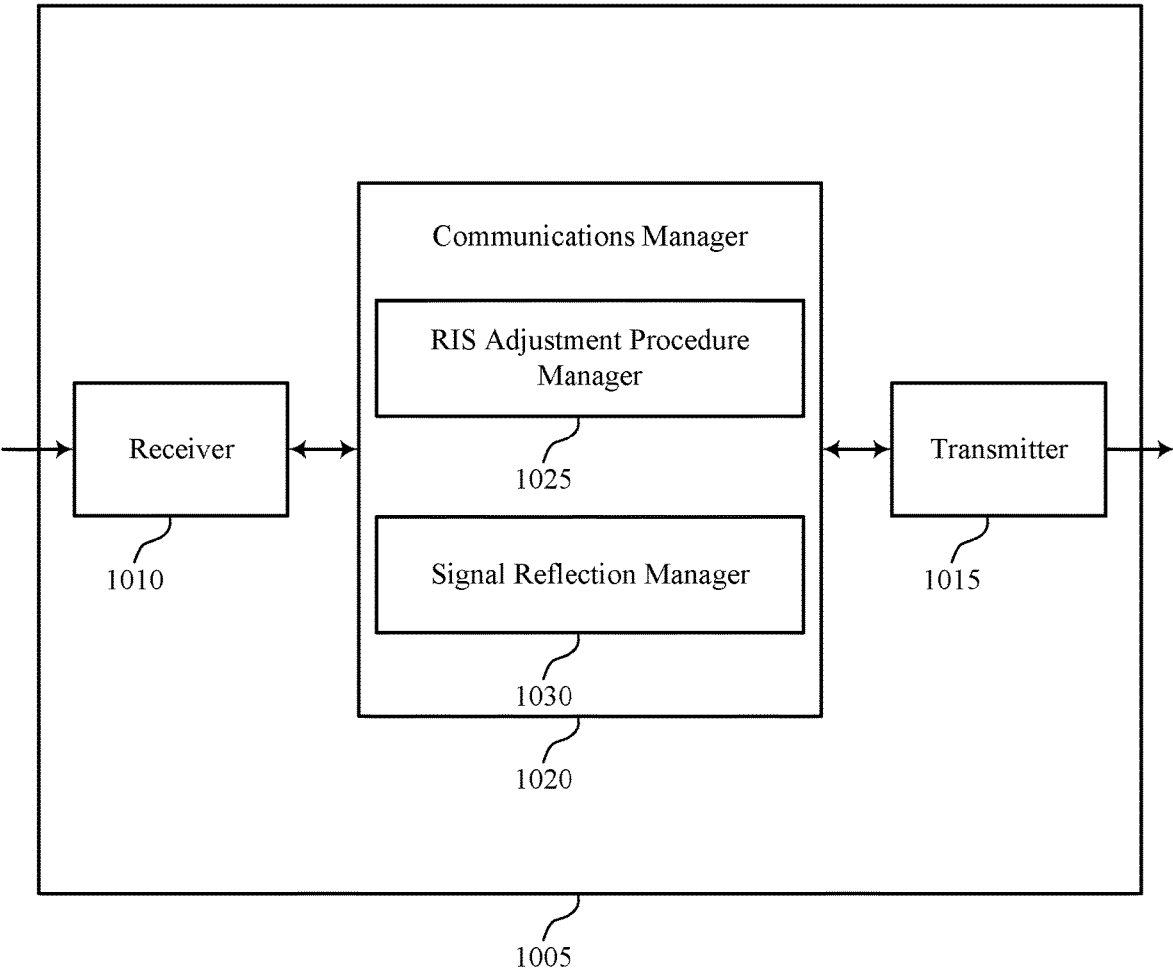

FIG. 10 shows a block diagram 1000 of a device 1005 that supports aperture magnification using reflective components for spatially multiplexed LOS communication in accordance with one or more aspects of the present disclosure. The device 1005 may be an example of aspects of a device 905 or a RIS as described herein. The device 1005 may include a receiver 1010, a transmitter 1015, and a communications manager 1020. The device 1005, or one or more components of the device 1005 (e.g., the receiver 1010, the transmitter 1015, and the communications manager 1020), may include at least one processor, which may be coupled with at least one memory, to support the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of aperture magnification using reflective components for spatially multiplexed LOS communication as described herein. For example, the communications manager 1020 may include a RIS adjustment procedure manager 1025 a signal reflection manager 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. The RIS adjustment procedure manager 1025 is capable of, configured to, or operable to support a means for performing an adjustment procedure of the RIS based on a target rank for spatially multiplexed communications between a first wireless device and a second wireless device. The signal reflection manager 1030 is capable of, configured to, or operable to support a means for reflecting at least one signal between a first set of antenna elements of the first wireless device and a second set of antenna elements of the second wireless device, where spatially multiplexed communications associated with reflection of the at least one signal are in accordance with the target rank, and where the target rank of the spatially multiplexed communications is greater than a rank of spatially multiplexed communications that is achievable without reflection via the RIS.

Figure 11:
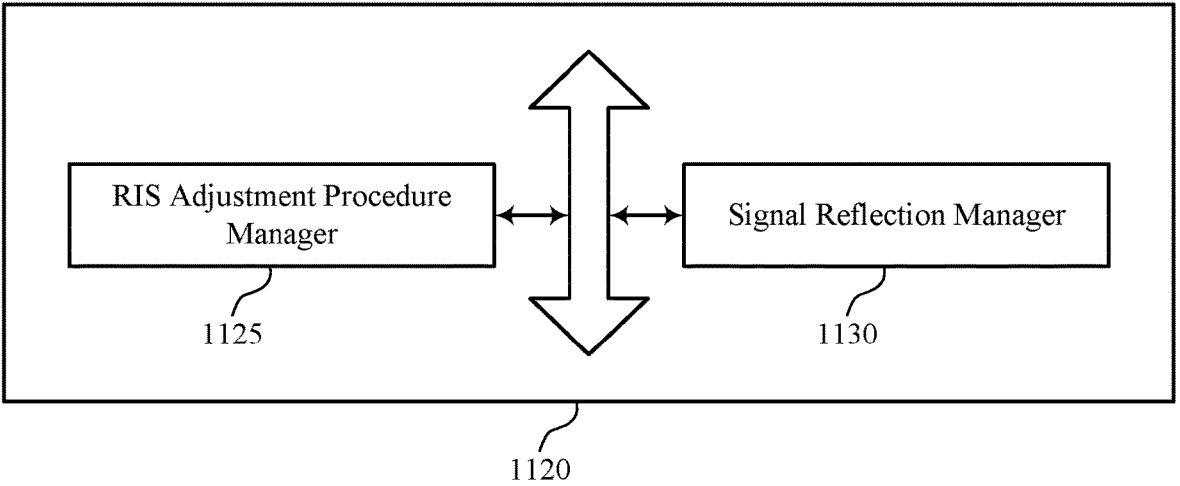
FIG. 11 shows a block diagram of a communications manager that supports aperture magnification using reflective components for spatially multiplexed LOS communication in accordance with one or more aspects of the present disclosure.
Figure 11:
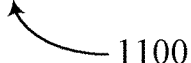

FIG. 11 shows a block diagram 1100 of a communications manager 1120 that supports aperture magnification using reflective components for spatially multiplexed LOS communication in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of aperture magnification using reflective components for spatially multiplexed LOS communication as described herein. For example, the communications manager 1120 may include a RIS adjustment procedure manager 1125 a signal reflection manager 1130, or any combination thereof. Each of these components, or components or subcomponents thereof (e.g., one or more processors, one or more memories), may communicate, directly or indirectly, with one another (e.g., via one or more buses).

The communications manager 1120 may support wireless communications in accordance with examples as disclosed herein. The RIS adjustment procedure manager 1125 is capable of, configured to, or operable to support a means for performing an adjustment procedure of the RIS based on a target rank for spatially multiplexed communications between a first wireless device and a second wireless device. The signal reflection manager 1130 is capable of, configured to, or operable to support a means for reflecting at least one signal between a first set of antenna elements of the first wireless device and a second set of antenna elements of the second wireless device, where spatially multiplexed communications associated with reflection of the at least one signal are in accordance with the target rank, and where the target rank of the spatially multiplexed communications is greater than a rank of spatially multiplexed communications that is achievable without reflection via the RIS.

In some examples, to support performing the adjustment procedure, the RIS adjustment procedure manager 1125 is capable of, configured to, or operable to support a means for adjusting a reflective property of reflective elements of the RIS based on the target rank of the spatially multiplexed communications, where reflecting the at least one signal is based on adjusting the reflective property.

In some examples, the RIS is associated with a set of multiple weight vectors and, to support adjusting the reflective property of the reflective elements, the RIS adjustment procedure manager 1125 is capable of, configured to, or operable to support a means for adjusting a weight vector of the RIS to be a first weight vector of the set of multiple weight vectors to cause the RIS to act as a concave mirror, where a focal point of the concave mirror is based on the first weight vector of the set of multiple weight vectors.

In some examples, to support adjusting the reflective property of the reflective elements of the RIS, the RIS adjustment procedure manager 1125 is capable of, configured to, or operable to support a means for adjusting the reflective property of the reflective elements of the RIS to increase one or more first effective distances between antenna elements of the first set of antenna elements of the first wireless device or one or more second effective distances between antenna elements of the second set of antenna elements of the second wireless device based on a focal point of the RIS, where the one or more first effective distances and the one or more second effective distances are based on the target rank of the spatially multiplexed communications.

In some examples, to support performing the adjustment procedure, the RIS adjustment procedure manager 1125 is capable of, configured to, or operable to support a means for adjusting an orientation of the RIS based on a first position of the first set of antenna elements of the first wireless device and a second position of the second set of antenna elements of the second wireless device, where reflecting the at least one signal is based on adjusting the orientation.

In some examples, the rank of spatially multiplexed communications that is achievable without reflection via the RIS is based on one or more first distances between antenna elements of the first set of antenna elements of the first wireless device, one or more second distances between antenna elements of the second set of antenna elements of the second wireless device, and a third distance between the first set of antenna elements and the second set of antenna elements.

In some examples, a focal point of the RIS is based on the target rank of the spatially multiplexed communications.

In some examples, the RIS is a reflective component of the first wireless device.

In some examples, the first set of antenna elements of the first wireless device is a set of transmitting antenna elements and the second set of antenna elements of the second wireless device is a set of receiving antenna elements.

In some examples, the first set of antenna elements of the first wireless device is a set of receiving antenna elements and the second set of antenna elements of the second wireless device is a set of transmitting antenna elements.

In some examples, to support reflecting the at least one signal, the signal reflection manager 1130 is capable of, configured to, or operable to support a means for reflecting the at least one signal based on a second reflective component of the second wireless device.

Figure 12:
FIG. 12 shows a diagram of a system including a device that supports aperture magnification using reflective components for spatially multiplexed LOS communication in accordance with one or more aspects of the present disclosure.

FIG. 12 shows a diagram of a system 1200 including a device 1205 that supports aperture magnification using reflective components for spatially multiplexed LOS communication in accordance with one or more aspects of the present disclosure. The device 1205 may be an example of or include the components of a device 905, a device 1005, or a RIS as described herein. The device 1205 may include components for bi-directional voice and data communications including components for transmitting and receiving communications, such as a communications manager 1220, a transceiver 1210, an antenna 1215, at least one memory 1225, code 1230, and at least one processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or one or more memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or one or more memory components (e.g., the at least one processor 1235, the at least one memory 1225, or both), may be included in a chip or chip assembly that is installed in the device 1205. In some examples, the transceiver 1210 may be operable to support communications via one or more communications links (e.g., a communication link 125, a backhaul communication link 120, a midhaul communication link 162, a fronthaul communication link 168).

The at least one memory 1225 may include RAM, ROM, or any combination thereof. The at least one memory 1225 may store computer-readable, computer-executable code 1230 including instructions that, when executed by one or more of the at least one processor 1235, cause the device 1205 to perform various functions described herein. The code 1230 may be stored in a non-transitory computer-readable medium such as system memory or another type of memory. In some cases, the code 1230 may not be directly executable by a processor of the at least one processor 1235 but may cause a computer (e.g., when compiled and executed) to perform functions described herein. In some cases, the at least one memory 1225 may contain, among other things, a BIOS which may control basic hardware or software operation such as the interaction with peripheral components or devices. In some examples, the at least one processor 1235 may include multiple processors and the at least one memory 1225 may include multiple memories. One or more of the multiple processors may be coupled with one or more of the multiple memories which may, individually or collectively, be configured to perform various functions herein (for example, as part of a processing system).

The at least one processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1235 may be configured to operate a memory array using a memory controller. In some other cases, a memory controller may be integrated into one or more of the at least one processor 1235. The at least one processor 1235 may be configured to execute computer-readable instructions stored in a memory (e.g., one or more of the at least one memory 1225) to cause the device 1205 to perform various functions (e.g., functions or tasks supporting aperture magnification using reflective components for spatially multiplexed LOS communication). For example, the device 1205 or a component of the device 1205 may include at least one processor 1235 and at least one memory 1225 coupled with one or more of the at least one processor 1235, the at least one processor 1235 and the at least one memory 1225 configured to perform various functions described herein. The at least one processor 1235 may be an example of a cloud-computing platform (e.g., one or more physical nodes and supporting software such as operating systems, virtual machines, or container instances) that may host the functions (e.g., by executing code 1230) to perform the functions of the device 1205. The at least one processor 1235 may be any one or more suitable processors capable of executing scripts or instructions of one or more software programs stored in the device 1205 (such as within one or more of the at least one memory 1225). In some implementations, the at least one processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the at least one processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the at least one memory 1225, the code 1230, and the at least one processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communications in accordance with examples as disclosed herein. For example, the communications manager 1220 is capable of, configured to, or operable to support a means for performing an adjustment procedure of the RIS based on a target rank for spatially multiplexed communications between a first wireless device and a second wireless device.

The communications manager 1220 is capable of, configured to, or operable to support a means for reflecting at least one signal between a first set of antenna elements of the first wireless device and a second set of antenna elements of the second wireless device, where spatially multiplexed communications associated with reflection of the at least one signal are in accordance with the target rank, and where the target rank of the spatially multiplexed communications is greater than a rank of spatially multiplexed communications that is achievable without reflection via the RIS.

By including or configuring the communications manager 1220 in accordance with examples as described herein, the device 1205 may support techniques for spatially multiplexed communications using reflective components to increase an achievable rank of the spatially multiplexed communications, which may allow for improved communication reliability, improved user experience related to reduced processing, improved utilization of processing capability, reduced hardware costs, and increased communication performance as a result of the increased rank of the spatially multiplexed communications.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, one or more of the at least one processor 1235, one or more of the at least one memory 1225, the code 1230, or any combination thereof (for example, by a processing system including at least a portion of the at least one processor 1235, the at least one memory 1225, the code 1230, or any combination thereof). For example, the code 1230 may include instructions executable by one or more of the at least one processor 1235 to cause the device 1205 to perform various aspects of aperture magnification using reflective components for spatially multiplexed LOS communication as described herein, or the at least one processor 1235 and the at least one memory 1225 may be otherwise configured to, individually or collectively, perform or support such operations.

FIG. 13 shows a flowchart illustrating a method 1300 that supports aperture magnification using reflective components for spatially multiplexed LOS communication in accordance with aspects of the present disclosure. The operations of the method 1300 may be implemented by a wireless device (e.g., a UE, a network entity) or its components as described herein. For example, the operations of the method 1300 may be performed by a wireless device as described with reference to FIGS. 1 through 8. In some examples, a wireless device may execute a set of instructions to control the functional elements of the wireless device to perform the described functions. Additionally, or alternatively, the wireless device may perform aspects of the described functions using special-purpose hardware.

At 1305, the method may include performing an adjustment procedure associated with a reflective component of the first wireless device based on a target rank for spatially multiplexed communications between the first wireless device and a second wireless device. The operations of 1305 may be performed in accordance with examples as disclosed herein. In some examples, aspects of the operations of 1305 may be performed by a reflective component adjustment manager 725 as described with reference to FIG. 7.

At 1310, the method may include performing the spatially multiplexed communications with the second wireless device using the reflective component based on the adjustment procedure and in accordance with the target rank, where the target rank of the spatially multiplexed communications is greater than a rank of spatially multiplexed communications that is achievable without reflection via the reflective component. The operations of 1310 may be performed in accordance with examples as disclosed herein. In some examples, aspects of the operations of 1310 may be performed by a spatially multiplexed communications manager 730 as described with reference to FIG. 7.

FIG. 14 shows a flowchart illustrating a method 1400 that supports aperture magnification using reflective components for spatially multiplexed LOS communication in accordance with aspects of the present disclosure. The operations of the method 1400 may be implemented by a wireless device (e.g., a UE, a network entity) or its components as described herein. For example, the operations of the method 1400 may be performed by a wireless device as described with reference to FIGS. 1 through 8. In some examples, a wireless device may execute a set of instructions to control the functional elements of the wireless device to perform the described functions. Additionally, or alternatively, the wireless device may perform aspects of the described functions using special-purpose hardware.

At 1405, the method may include performing an adjustment procedure associated with a reflective component of the first wireless device based on a target rank for spatially multiplexed communications between the first wireless device and a second wireless device. The operations of 1405 may be performed in accordance with examples as disclosed herein. In some examples, aspects of the operations of 1405 may be performed by a reflective component adjustment manager 725 as described with reference to FIG. 7.

At 1410, the method may include adjusting a reflective property of reflective elements of the reflective component (e.g., where the reflective component is a RIS) based on the target rank of the spatially multiplexed communications, where performing the spatially multiplexed communications is based on adjusting the reflective property. The operations of 1410 may be performed in accordance with examples as disclosed herein. In some examples, aspects of the operations of 1410 may be performed by a reflective component adjustment manager 725 as described with reference to FIG. 7.

At 1415, the method may include performing the spatially multiplexed communications with the second wireless device using the reflective component based on the adjustment procedure and in accordance with the target rank, where the target rank of the spatially multiplexed communications is greater than a rank of spatially multiplexed communications that is achievable without reflection via the reflective component. The operations of 1415 may be performed in accordance with examples as disclosed herein. In some examples, aspects of the operations of 1415 may be performed by a spatially multiplexed communications manager 730 as described with reference to FIG. 7.

FIG. 15 shows a flowchart illustrating a method 1500 that supports aperture magnification using reflective components for spatially multiplexed LOS communication in accordance with aspects of the present disclosure. The operations of the method 1500 may be implemented by a wireless device (e.g., a UE, a network entity) or its components as described herein. For example, the operations of the method 1500 may be performed by a wireless device as described with reference to FIGS. 1 through 8. In some examples, a wireless device may execute a set of instructions to control the functional elements of the wireless device to perform the described functions. Additionally, or alternatively, the wireless device may perform aspects of the described functions using special-purpose hardware.

At 1505, the method may include performing an adjustment procedure associated with a reflective component of the first wireless device based on a target rank for spatially multiplexed communications between the first wireless device and a second wireless device. The operations of 1505 may be performed in accordance with examples as disclosed herein. In some examples, aspects of the operations of 1505 may be performed by a reflective component adjustment manager 725 as described with reference to FIG. 7.

At 1510, the method may include adjusting a reflective property of reflective elements of the reflective component (e.g., where the reflective component is a RIS) based on the target rank of the spatially multiplexed communications, where performing the spatially multiplexed communications is based on adjusting the reflective property. The operations of 1510 may be performed in accordance with examples as disclosed herein. In some examples, aspects of the operations of 1510 may be performed by a reflective component adjustment manager 725 as described with reference to FIG. 7.

At 1515, the method may include adjusting a weight vector of the reflective component to be a first weight vector of a set of multiple weight vectors to cause the reflective component to act as a concave mirror, where a focal point of the concave mirror is based on the first weight vector of the set of multiple weight vectors. The operations of 1515 may be performed in accordance with examples as disclosed herein. In some examples, aspects of the operations of 1515 may be performed by a reflective component adjustment manager 725 as described with reference to FIG. 7.

At 1520, the method may include performing the spatially multiplexed communications with the second wireless device using the reflective component based on the adjustment procedure and in accordance with the target rank, where the target rank of the spatially multiplexed communications is greater than a rank of spatially multiplexed communications that is achievable without reflection via the reflective component. The operations of 1520 may be performed in accordance with examples as disclosed herein. In some examples, aspects of the operations of 1520 may be performed by a spatially multiplexed communications manager 730 as described with reference to FIG. 7.

FIG. 16 shows a flowchart illustrating a method 1600 that supports aperture magnification using reflective components for spatially multiplexed LOS communication in accordance with aspects of the present disclosure. The operations of the method 1600 may be implemented by a RIS or its components as described herein. For example, the operations of the method 1600 may be performed by a RIS as described with reference to FIGS. 1 through 4 and 9 through 12. In some examples, a RIS may execute a set of instructions to control the functional elements of the RIS to perform the described functions. Additionally, or alternatively, the RIS may perform aspects of the described functions using special-purpose hardware.

At 1605, the method may include performing an adjustment procedure of the RIS based on a target rank for spatially multiplexed communications between a first wireless device and a second wireless device. The operations of 1605 may be performed in accordance with examples as disclosed herein. In some examples, aspects of the operations of 1605 may be performed by a RIS adjustment procedure manager 1125 as described with reference to FIG. 11.

At 1610, the method may include reflecting at least one signal between a first set of antenna elements of the first wireless device and a second set of antenna elements of the second wireless device, where spatially multiplexed communications associated with reflection of the at least one signal are in accordance with the target rank, and where the target rank of the spatially multiplexed communications is greater than a rank of spatially multiplexed communications that is achievable without reflection via the RIS. The operations of 1610 may be performed in accordance with examples as disclosed herein. In some examples, aspects of the operations of 1610 may be performed by a signal reflection manager 1130 as described with reference to FIG. 11.

FIG. 17 shows a flowchart illustrating a method 1700 that supports aperture magnification using reflective components for spatially multiplexed LOS communication in accordance with aspects of the present disclosure. The operations of the method 1700 may be implemented by a RIS or its components as described herein. For example, the operations of the method 1700 may be performed by a RIS as described with reference to FIGS. 1 through 4 and 9 through 12. In some examples, a RIS may execute a set of instructions to control the functional elements of the RIS to perform the described functions. Additionally, or alternatively, the RIS may perform aspects of the described functions using special-purpose hardware.

At 1705, the method may include performing an adjustment procedure of the RIS based on a target rank for spatially multiplexed communications between a first wireless device and a second wireless device. The operations of 1705 may be performed in accordance with examples as disclosed herein. In some examples, aspects of the operations of 1705 may be performed by a RIS adjustment procedure manager 1125 as described with reference to FIG. 11.

At 1710, the method may include adjusting a reflective property of reflective elements of the RIS based on the target rank of the spatially multiplexed communications, where reflecting the at least one signal is based on adjusting the reflective property. The operations of 1710 may be performed in accordance with examples as disclosed herein. In some examples, aspects of the operations of 1710 may be performed by a RIS adjustment procedure manager 1125 as described with reference to FIG. 11.

At 1715, the method may include reflecting at least one signal between a first set of antenna elements of the first wireless device and a second set of antenna elements of the second wireless device, where spatially multiplexed communications associated with reflection of the at least one signal are in accordance with the target rank, and where the target rank of the spatially multiplexed communications is greater than a rank of spatially multiplexed communications that is achievable without reflection via the RIS. The operations of 1715 may be performed in accordance with examples as disclosed herein. In some examples, aspects of the operations of 1715 may be performed by a signal reflection manager 1130 as described with reference to FIG. 11.

FIG. 18 shows a flowchart illustrating a method 1800 that supports aperture magnification using reflective components for spatially multiplexed LOS communication in accordance with aspects of the present disclosure. The operations of the method 1800 may be implemented by a RIS or its components as described herein. For example, the operations of the method 1800 may be performed by a RIS as described with reference to FIGS. 1 through 4 and 9 through 12. In some examples, a RIS may execute a set of instructions to control the functional elements of the RIS to perform the described functions. Additionally, or alternatively, the RIS may perform aspects of the described functions using special-purpose hardware.

At 1805, the method may include performing an adjustment procedure of the RIS based on a target rank for spatially multiplexed communications between a first wireless device and a second wireless device. The operations of 1805 may be performed in accordance with examples as disclosed herein. In some examples, aspects of the operations of 1805 may be performed by a RIS adjustment procedure manager 1125 as described with reference to FIG. 11.

At 1810, the method may include adjusting a reflective property of reflective elements of the RIS based on the target rank of the spatially multiplexed communications, where reflecting the at least one signal is based on adjusting the reflective property. The operations of 1810 may be performed in accordance with examples as disclosed herein. In some examples, aspects of the operations of 1810 may be performed by a RIS adjustment procedure manager 1125 as described with reference to FIG. 11.

At 1815, the method may include adjusting a weight vector of the RIS to be a first weight vector of a set of multiple weight vectors to cause the RIS to act as a concave mirror, where a focal point of the concave mirror is based on the first weight vector of the set of multiple weight vectors. The operations of 1815 may be performed in accordance with examples as disclosed herein. In some examples, aspects of the operations of 1815 may be performed by a RIS adjustment procedure manager 1125 as described with reference to FIG. 11.

At 1820, the method may include reflecting at least one signal between a first set of antenna elements of the first wireless device and a second set of antenna elements of the second wireless device, where spatially multiplexed communications associated with reflection of the at least one signal are in accordance with the target rank, and where the target rank of the spatially multiplexed communications is greater than a rank of spatially multiplexed communications that is achievable without reflection via the RIS. The operations of 1820 may be performed in accordance with examples as disclosed herein. In some examples, aspects of the operations of 1820 may be performed by a signal reflection manager 1130 as described with reference to FIG. 11.

The following provides an overview of aspects of the present disclosure:

Aspect 1: A method for wireless communications by a first wireless device, comprising: performing an adjustment procedure associated with a reflective component of the first wireless device based at least in part on a target rank for spatially multiplexed communications between the first wireless device and a second wireless device; and performing the spatially multiplexed communications with the second wireless device using the reflective component based at least in part on the adjustment procedure and in accordance with the target rank, wherein the target rank of the spatially multiplexed communications is greater than a rank of spatially multiplexed communications that is achievable without reflection via the reflective component.

Aspect 2: The method of aspect 1, wherein the reflective component is a RIS and performing the adjustment procedure comprises: adjusting a reflective property of reflective elements of the RIS based at least in part on the target rank of the spatially multiplexed communications, wherein performing the spatially multiplexed communications is based at least in part on adjusting the reflective property.

Aspect 3: The method of aspect 2, wherein the RIS is associated with a plurality of weight vectors, and adjusting the reflective property of the reflective elements comprises: adjusting a weight vector of the RIS to be a first weight vector of the plurality of weight vectors to cause the RIS to act as a concave mirror, wherein a focal point of the concave mirror is based at least in part on the first weight vector of the plurality of weight vectors.

Aspect 4: The method of any of aspects 2 through 3, wherein adjusting the reflective property of the reflective elements of the RIS comprises: adjusting the reflective property of the reflective elements of the RIS to increase one or more first effective distances between antenna elements of a first set of antenna elements of the first wireless device or one or more second effective distances between antenna elements of a second set of antenna elements of the second wireless device based at least in part on a focal point of the RIS, wherein the one or more first effective distances and the one or more second effective distances are based at least in part on the target rank of the spatially multiplexed communications.

Aspect 5: The method of any of aspects 1 through 4, wherein performing the adjustment procedure comprises: adjusting an orientation of the reflective component based at least in part on a first position of a first set of antenna elements of the first wireless device and a second position of a second set of antenna elements of the second wireless device, wherein performing the spatially multiplexed communications is based at least in part on adjusting the orientation.

Aspect 6: The method of any of aspects 1 through 5, wherein the rank of spatially multiplexed communications that is achievable without reflection via the reflective component is based at least in part on one or more first distances between antenna elements of a first set of antenna elements of the first wireless device, one or more second distances between antenna elements of a second set of antenna elements of the second wireless device, and a third distance between the first set of antenna elements and the second set of antenna elements.

Aspect 7: The method of any of aspects 1 through 6, wherein a focal point of the reflective component is based at least in part on the target rank of the spatially multiplexed communications.

Aspect 8: The method of any of aspects 1 through 7, wherein performing the spatially multiplexed communications comprises: performing the spatially multiplexed communications with the second wireless device in accordance with a second reflective component of the second wireless device.

Aspect 9: The method of any of aspects 1 through 8, wherein a first set of antenna elements of the first wireless device is a set of transmitting antenna elements and a second set of antenna elements of the second wireless device is a set of receiving antenna elements.

Aspect 10: The method of any of aspects 1 through 8, wherein a first set of antenna elements of the first wireless device is a set of receiving antenna elements and a second set of antenna elements of the second wireless device is a set of transmitting antenna elements.

Aspect 11: The method of any of aspects 1 and 5 through 10, wherein the reflective component is a concave mirror.

Aspect 12: A method for wireless communications at a RIS, comprising: performing an adjustment procedure of the RIS based at least in part on a target rank for spatially multiplexed communications between a first wireless device and a second wireless device; and reflecting at least one signal between a first set of antenna elements of the first wireless device and a second set of antenna elements of the second wireless device, wherein spatially multiplexed communications associated with reflection of the at least one signal are in accordance with the target rank, and wherein the target rank of the spatially multiplexed communications is greater than a rank of spatially multiplexed communications that is achievable without reflection via the RIS.

Aspect 13: The method of aspect 12, wherein performing the adjustment procedure comprises: adjusting a reflective property of reflective elements of the RIS based at least in part on the target rank of the spatially multiplexed communications, wherein reflecting the at least one signal is based at least in part on adjusting the reflective property.

Aspect 14: The method of aspect 13, wherein the RIS is associated with a plurality of weight vectors, and adjusting the reflective property of the reflective elements comprises: adjusting a weight vector of the RIS to be a first weight vector of the plurality of weight vectors to cause the RIS to act as a concave mirror, wherein a focal point of the concave mirror is based at least in part on the first weight vector of the plurality of weight vectors.

Aspect 15: The method of any of aspects 13 through 14, wherein adjusting the reflective property of the reflective elements of the RIS comprises: adjusting the reflective property of the reflective elements of the RIS to increase one or more first effective distances between antenna elements of the first set of antenna elements of the first wireless device or one or more second effective distances between antenna elements of the second set of antenna elements of the second wireless device based at least in part on a focal point of the RIS, wherein the one or more first effective distances and the one or more second effective distances are based at least in part on the target rank of the spatially multiplexed communications.

Aspect 16: The method of any of aspects 12 through 15, wherein performing the adjustment procedure comprises: adjusting an orientation of the RIS based at least in part on a first position of the first set of antenna elements of the first wireless device and a second position of the second set of antenna elements of the second wireless device, wherein reflecting the at least one signal is based at least in part on adjusting the orientation.

Aspect 17: The method of any of aspects 12 through 16, wherein the rank of spatially multiplexed communications that is achievable without reflection via the RIS is based at least in part on one or more first distances between antenna elements of the first set of antenna elements of the first wireless device, one or more second distances between antenna elements of the second set of antenna elements of the second wireless device, and a third distance between the first set of antenna elements and the second set of antenna elements.

Aspect 18: The method of any of aspects 12 through 17, wherein a focal point of the RIS is based at least in part on the target rank of the spatially multiplexed communications.

Aspect 19: The method of any of aspects 12 through 18, wherein the RIS is a reflective component of the first wireless device.

Aspect 20: The method of aspect 19, wherein the first set of antenna elements of the first wireless device is a set of transmitting antenna elements and the second set of antenna elements of the second wireless device is a set of receiving antenna elements.

Aspect 21: The method of aspect 19, wherein the first set of antenna elements of the first wireless device is a set of receiving antenna elements and the second set of antenna elements of the second wireless device is a set of transmitting antenna elements.

Aspect 22: The method of any of aspects 19 through 21, wherein reflecting the at least one signal comprises: reflecting the at least one signal based at least in part on a second reflective component of the second wireless device.

Aspect 23: A first wireless device for wireless communications, comprising one or more memories storing processor-executable code, and one or more processors coupled with the one or more memories and individually or collectively operable to execute the code to cause the first wireless device to perform a method of any of aspects 1 through 11.

Aspect 24: A first wireless device for wireless communications, comprising at least one means for performing a method of any of aspects 1 through 11.

Aspect 25: A non-transitory computer-readable medium storing code for wireless communications, the code comprising instructions executable by a processor to perform a method of any of aspects 1 through 11.

Aspect 26: A RIS for wireless communications, comprising one or more memories storing processor-executable code, and one or more processors coupled with the one or more memories and individually or collectively operable to execute the code to cause the RIS to perform a method of any of aspects 12 through 22.

Aspect 27: A RIS for wireless communications, comprising at least one means for performing a method of any of aspects 12 through 22.

Aspect 28: A non-transitory computer-readable medium storing code for wireless communications, the code comprising instructions executable by a processor to perform a method of any of aspects 12 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first wireless device, comprising:
one or more memories storing processor-executable code; and
one or more processors coupled with the one or more memories and individually or collectively operable to execute the code to cause the first wireless device to:
perform an adjustment procedure associated with a reflective component of the first wireless device based at least in part on a target rank for spatially multiplexed communications between the first wireless device and a second wireless device, wherein the adjustment procedure adjusts an effective aperture size of a first set of antenna elements of the first wireless device; and
perform the spatially multiplexed communications with the second wireless device using the reflective component based at least in part on the adjustment procedure and in accordance with the target rank, wherein the target rank of the spatially multiplexed communications is greater than a rank of spatially multiplexed communications that is achievable without reflection via the reflective component.

2. The first wireless device of claim 1, wherein the reflective component is a reflective intelligent surface (RIS), and, to perform the adjustment procedure, the one or more processors are individually or collectively operable to execute the code to cause the first wireless device to:
adjust a reflective property of reflective elements of the RIS based at least in part on the target rank of the spatially multiplexed communications, wherein performing the spatially multiplexed communications is based at least in part on adjusting the reflective property.

3. The first wireless device of claim 2, wherein the RIS is associated with a plurality of weight vectors, and, to adjust the reflective property of the reflective elements, the one or more processors are individually or collectively operable to execute the code to cause the first wireless device to:

adjust a weight vector of the RIS to be a first weight vector of the plurality of weight vectors to cause the RIS to act as a concave mirror, wherein a focal point of the concave mirror is based at least in part on the first weight vector of the plurality of weight vectors.

4. The first wireless device of claim 2, wherein, to adjust the reflective property of the reflective elements of the RIS, the one or more processors are individually or collectively operable to execute the code to cause the first wireless device to:
adjust the reflective property of the reflective elements of the RIS to increase one or more first effective distances between antenna elements of the first set of antenna elements of the first wireless device or one or more second effective distances between antenna elements of a second set of antenna elements of the second wireless device based at least in part on a focal point of the RIS, wherein the one or more first effective distances and the one or more second effective distances are based at least in part on the target rank of the spatially multiplexed communications.

5. The first wireless device of claim 1, wherein, to perform the adjustment procedure, the one or more processors are individually or collectively operable to execute the code to cause the first wireless device to:
adjust an orientation of the reflective component based at least in part on a first position of the first set of antenna elements of the first wireless device and a second position of a second set of antenna elements of the second wireless device, wherein performing the spatially multiplexed communications is based at least in part on adjusting the orientation.

6. The first wireless device of claim 1, wherein the rank of spatially multiplexed communications that is achievable without reflection via the reflective component is based at least in part on one or more first distances between antenna elements of the first set of antenna elements of the first wireless device, one or more second distances between antenna elements of a second set of antenna elements of the second wireless device, and a third distance between the first set of antenna elements and the second set of antenna elements.

7. The first wireless device of claim 1, wherein a focal point of the reflective component is based at least in part on the target rank of the spatially multiplexed communications.

8. The first wireless device of claim 1, wherein, to perform the spatially multiplexed communications, the one or more processors are individually or collectively operable to execute the code to cause the first wireless device to:
perform the spatially multiplexed communications with the second wireless device in accordance with a second reflective component of the second wireless device.

9. The first wireless device of claim 1, wherein the first set of antenna elements of the first wireless device is a set of transmitting antenna elements and a second set of antenna elements of the second wireless device is a set of receiving antenna elements.

10. The first wireless device of claim 1, wherein the first set of antenna elements of the first wireless device is a set of receiving antenna elements and a second set of antenna elements of the second wireless device is a set of transmitting antenna elements.

11. The first wireless device of claim 1, wherein the reflective component is a concave mirror.

12. A reflective intelligent surface (RIS), comprising:
one or more memories storing processor-executable code; and one or more processors coupled with the one or more memories and individually or collectively operable to execute the code to cause the RIS to:

perform an adjustment procedure of the RIS based at least in part on a target rank for spatially multiplexed communications between a first wireless device and a second wireless device, wherein the adjustment procedure adjusts an effective aperture size of a first set of antenna elements of the RIS; and reflect at least one signal between the first set of antenna elements of the first wireless device and a second set of antenna elements of the second wireless device, wherein spatially multiplexed communications associated with reflection of the at least one signal are in accordance with the target rank, and wherein the target rank of the spatially multiplexed communications is greater than a rank of spatially multiplexed communications that is achievable without reflection via the RIS.

13. The RIS of claim 12, wherein, to perform the adjustment procedure, the one or more processors are individually or collectively operable to execute the code to cause the RIS to:

adjust a reflective property of reflective elements of the RIS based at least in part on the target rank of the spatially multiplexed communications, wherein reflecting the at least one signal is based at least in part on adjusting the reflective property.

14. The RIS of claim 13, wherein the RIS is associated with a plurality of weight vectors, and, to adjust the reflective property of the reflective elements, the one or more processors are individually or collectively operable to execute the code to cause the RIS to:

adjust a weight vector of the RIS to be a first weight vector of the plurality of weight vectors to cause the RIS to act as a concave mirror, wherein a focal point of the concave mirror is based at least in part on the first weight vector of the plurality of weight vectors.

15. The RIS of claim 13, wherein, to adjust the reflective property of the reflective elements of the RIS, the one or more processors are individually or collectively operable to execute the code to cause the RIS to:

adjust the reflective property of the reflective elements of the RIS to increase one or more first effective distances between antenna elements of the first set of antenna elements of the first wireless device or one or more second effective distances between antenna elements of the second set of antenna elements of the second wireless device based at least in part on a focal point of the RIS, wherein the one or more first effective distances and the one or more second effective distances are based at least in part on the target rank of the spatially multiplexed communications.

16. The RIS of claim 12, wherein, to perform the adjustment procedure, the one or more processors are individually or collectively operable to execute the code to cause the RIS to:

adjust an orientation of the RIS based at least in part on a first position of the first set of antenna elements of the first wireless device and a second position of the second set of antenna elements of the second wireless device, wherein reflecting the at least one signal is based at least in part on adjusting the orientation.

17. The RIS of claim 12, wherein the rank of spatially multiplexed communications that is achievable without reflection via the RIS is based at least in part on one or more first distances between antenna elements of the first set of antenna elements of the first wireless device, one or more second distances between antenna elements of the second set of antenna elements of the second wireless device, and a third distance between the first set of antenna elements and the second set of antenna elements.

18. The RIS of claim 12, wherein a focal point of the RIS is based at least in part on the target rank of the spatially multiplexed communications.

19. The RIS of claim 12, wherein the RIS is a reflective component of the first wireless device.

20. The RIS of claim 19, wherein the first set of antenna elements of the first wireless device is a set of transmitting antenna elements and the second set of antenna elements of the second wireless device is a set of receiving antenna elements.

21. The RIS of claim 19, wherein the first set of antenna elements of the first wireless device is a set of receiving antenna elements and the second set of antenna elements of the second wireless device is a set of transmitting antenna elements.

22. The RIS of claim 19, wherein, to reflect the at least one signal, the one or more processors are individually or collectively operable to execute the code to cause the RIS to:

reflect the at least one signal based at least in part on a second reflective component of the second wireless device.

23. A method for wireless communications by a first wireless device, comprising:

performing an adjustment procedure associated with a reflective component of the first wireless device based at least in part on a target rank for spatially multiplexed communications between the first wireless device and a second wireless device, wherein the adjustment procedure adjusts an effective aperture size of a first set of antenna elements of the first wireless device; and performing the spatially multiplexed communications with the second wireless device using the reflective component based at least in part on the adjustment procedure and in accordance with the target rank, wherein the target rank of the spatially multiplexed communications is greater than a rank of spatially multiplexed communications that is achievable without reflection via the reflective component.

24. The method of claim 23, wherein the reflective component is a reflective intelligent surface (RIS) and performing the adjustment procedure comprises:

adjusting a reflective property of reflective elements of the RIS based at least in part on the target rank of the spatially multiplexed communications, wherein performing the spatially multiplexed communications is based at least in part on adjusting the reflective property.

25. The method of claim 24, wherein the RIS is associated with a plurality of weight vectors, and adjusting the reflective property of the reflective elements comprises:

adjusting a weight vector of the RIS to be a first weight vector of the plurality of weight vectors to cause the RIS to act as a concave mirror, wherein a focal point of the concave mirror is based at least in part on the first weight vector of the plurality of weight vectors.

26. The method of claim 24, wherein adjusting the reflective property of the reflective elements of the RIS comprises:

adjusting the reflective property of the reflective elements of the RIS to increase one or more first effective distances between antenna elements of the first set of antenna elements of the first wireless device or one or more second effective distances between antenna elements of a second set of antenna elements of the second wireless device based at least in part on a focal point of the RIS, wherein the one or more first effective distances and the one or more second effective distances are based at least in part on the target rank of the spatially multiplexed communications.

27. The method of claim 23, wherein performing the adjustment procedure comprises:

adjusting an orientation of the reflective component based at least in part on a first position of the first set of antenna elements of the first wireless device and a second position of a second set of antenna elements of the second wireless device, wherein performing the spatially multiplexed communications is based at least in part on adjusting the orientation.

28. A method for wireless communications at a reflective intelligent surface (RIS), comprising:

performing an adjustment procedure of the RIS based at least in part on a target rank for spatially multiplexed communications between a first wireless device and a second wireless device, wherein the adjustment procedure adjusts an effective aperture size of a first set of antenna elements of the RIS; and reflecting at least one signal between the first set of antenna elements of the first wireless device and a second set of antenna elements of the second wireless device, wherein spatially multiplexed communications associated with reflection of the at least one signal are in accordance with the target rank, and wherein the target rank of the spatially multiplexed communications is greater than a rank of spatially multiplexed communications that is achievable without reflection via the RIS.

29. The method of claim 28, wherein performing the adjustment procedure comprises:

adjusting a reflective property of reflective elements of the RIS based at least in part on the target rank of the spatially multiplexed communications, wherein reflecting the at least one signal is based at least in part on adjusting the reflective property.

30. The method of claim 29, wherein the RIS is associated with a plurality of weight vectors, and adjusting the reflective property of the reflective elements comprises:

adjusting a weight vector of the RIS to be a first weight vector of the plurality of weight vectors to cause the RIS to act as a concave mirror, wherein a focal point of the concave mirror is based at least in part on the first weight vector of the plurality of weight vectors.

* * * * *